(12) United States Patent
Chatterjee et al.

(10) Patent No.: US 8,437,695 B2
(45) Date of Patent: *May 7, 2013

(54) POWER BRIDGE CIRCUIT FOR BI-DIRECTIONAL INDUCTIVE SIGNALING

(75) Inventors: Manjirnath Chatterjee, San Francisco, CA (US); Michael Lehr, Sunnyvale, CA (US); Dyke Shaffer, Santa Rosa, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 225 days.

This patent is subject to a terminal disclaimer.

(21) Appl. No.: 12/841,001

(22) Filed: Jul. 21, 2010

(65) Prior Publication Data

US 2011/0037321 A1 Feb. 17, 2011

Related U.S. Application Data

(63) Continuation-in-part of application No. 12/628,401, filed on Dec. 1, 2009.

(60) Provisional application No. 61/227,413, filed on Jul. 21, 2009, provisional application No. 61/227,423, filed on Jul. 21, 2009.

(51) Int. Cl.
*H04B 5/00* (2006.01)

(52) U.S. Cl.
USPC ........ 455/41.1; 455/41.2; 455/41.3; 336/130; 336/131; 381/79; 307/104

(58) Field of Classification Search ............. 455/1, 3.03, 455/41.1, 41.2, 41.3; 336/130, 131, 132, 336/133, 134; 381/79; 307/104
See application file for complete search history.

(56) References Cited

U.S. PATENT DOCUMENTS

| 5,375,226 A | 12/1994 | Sano et al. |
| 5,455,466 A | 10/1995 | Parks et al. |
| 5,596,567 A | 1/1997 | deMuro et al. |
| 5,600,225 A | 2/1997 | Goto |
| 5,666,530 A | 9/1997 | Clark et al. |
| 5,733,313 A | 3/1998 | Barreras et al. |
| 5,760,580 A | 6/1998 | Tyren |
| 5,831,348 A | 11/1998 | Nishizawa |
| 5,958,051 A | 9/1999 | Renaud et al. |

(Continued)

FOREIGN PATENT DOCUMENTS

| CN | 1592197 A | 3/2005 |
| EP | 395469 A2 | 10/1990 |

(Continued)

OTHER PUBLICATIONS

U.S. Appl. No. 12/916,388, filed Oct. 29, 2010, Chatterjee et al.

(Continued)

*Primary Examiner* — Tuan H Nguyen

(57) ABSTRACT

An inductive signal interface comprises a coil assembly including one or more inductive coils, a bridge circuit including a plurality of switches, and control circuitry. The control circuitry is configured to individually operate the plurality of switches to enable the inductive signal interface to dynamically switch between a power-transmit mode and a power receive mode.

19 Claims, 11 Drawing Sheets

U.S. PATENT DOCUMENTS

| | | | |
|---|---|---|---|
| 6,006,274 A | 12/1999 | Hawkins et al. |
| 6,138,245 A | 10/2000 | Son et al. |
| 6,184,651 B1 | 2/2001 | Fernandez et al. |
| 6,266,539 B1 | 7/2001 | Pardo |
| 6,330,436 B1 | 12/2001 | Zidel |
| 6,389,423 B1 | 5/2002 | Sakakura |
| 6,400,274 B1 | 6/2002 | Duan et al. |
| 6,405,049 B2 | 6/2002 | Herrod et al. |
| 6,436,299 B1 | 8/2002 | Baarman et al. |
| 6,445,936 B1 | 9/2002 | Cannon et al. |
| 6,501,364 B1 | 12/2002 | Hui et al. |
| 6,510,424 B1 | 1/2003 | Ford et al. |
| 6,532,152 B1 | 3/2003 | White et al. |
| 6,673,250 B2 | 1/2004 | Kuennen et al. |
| 6,731,071 B2 | 5/2004 | Baarman |
| 6,795,110 B1 | 9/2004 | Kossin |
| 6,803,744 B1 | 10/2004 | Sabo |
| 6,806,649 B2 | 10/2004 | Mollema et al. |
| 6,810,405 B1 | 10/2004 | LaRue et al. |
| 6,812,645 B2 | 11/2004 | Baarman |
| 6,825,620 B2 | 11/2004 | Kuennen et al. |
| 6,831,417 B2 | 12/2004 | Baarman |
| 6,888,438 B2 | 5/2005 | Hui et al. |
| 6,917,163 B2 | 7/2005 | Baarman |
| 6,975,198 B2 | 12/2005 | Baarman et al. |
| 6,986,051 B2 | 1/2006 | Le Pennec et al. |
| 7,065,658 B1 | 6/2006 | Baraban et al. |
| 7,116,200 B2 | 10/2006 | Baarman et al. |
| 7,118,240 B2 | 10/2006 | Baarman et al. |
| 7,126,450 B2 | 10/2006 | Baarman et al. |
| 7,132,918 B2 | 11/2006 | Baarman et al. |
| 7,149,473 B1 | 12/2006 | Lindlar et al. |
| 7,164,255 B2 | 1/2007 | Hui |
| 7,248,017 B2 | 7/2007 | Cheng et al. |
| 7,262,700 B2 | 8/2007 | Hsu |
| 7,271,569 B2 | 9/2007 | Oglesbee |
| 7,286,880 B2 | 10/2007 | Olson et al. |
| 7,323,964 B1 * | 1/2008 | Shyu et al. .............. 336/131 |
| 7,331,793 B2 | 2/2008 | Hernandez et al. |
| 7,352,567 B2 * | 4/2008 | Hotelling et al. ........ 361/679.55 |
| 7,375,492 B2 | 5/2008 | Calhoon et al. |
| 7,382,636 B2 | 6/2008 | Baarman et al. |
| 7,385,357 B2 | 6/2008 | Kuennen et al. |
| 7,392,059 B2 | 6/2008 | White et al. |
| 7,414,380 B2 | 8/2008 | Tang et al. |
| 7,446,672 B2 | 11/2008 | Johnson et al. |
| 7,454,170 B2 | 11/2008 | Goossens et al. |
| 7,462,951 B1 | 12/2008 | Baarman |
| 7,471,986 B2 | 12/2008 | Hatlestad |
| 7,495,414 B2 | 2/2009 | Hui |
| 7,521,890 B2 | 4/2009 | Lee et al. |
| 7,576,514 B2 | 8/2009 | Hui |
| 7,627,343 B2 * | 12/2009 | Fadell et al. .................. 455/557 |
| 7,743,151 B2 | 6/2010 | Vallapureddy et al. |
| 2002/0084698 A1 | 7/2002 | Kelly et al. |
| 2002/0103008 A1 | 8/2002 | Rahn et al. |
| 2003/0214255 A1 | 11/2003 | Baarman et al. |
| 2003/0233455 A1 | 12/2003 | Leber et al. |
| 2004/0088012 A1 | 5/2004 | Kroll et al. |
| 2004/0130915 A1 | 7/2004 | Baarman |
| 2004/0130916 A1 | 7/2004 | Baarman |
| 2004/0150934 A1 | 8/2004 | Baarman |
| 2004/0222751 A1 | 11/2004 | Mollema et al. |
| 2004/0232845 A1 | 11/2004 | Baarman et al. |
| 2004/0259499 A1 | 12/2004 | Oba et al. |
| 2004/0266362 A1 | 12/2004 | Watkins et al. |
| 2005/0007067 A1 | 1/2005 | Baarman et al. |
| 2005/0093475 A1 | 5/2005 | Kuennen et al. |
| 2005/0116650 A1 | 6/2005 | Baarman |
| 2005/0122058 A1 | 6/2005 | Baarman et al. |
| 2005/0122059 A1 | 6/2005 | Baarman et al. |
| 2005/0127849 A1 | 6/2005 | Baarman et al. |
| 2005/0127850 A1 | 6/2005 | Baarman et al. |
| 2006/0041420 A1 | 2/2006 | Martin et al. |
| 2006/0061958 A1 | 3/2006 | Solomon et al. |
| 2006/0123055 A1 | 6/2006 | Atkinson et al. |
| 2006/0132045 A1 | 6/2006 | Baarman |
| 2006/0187049 A1 | 8/2006 | Moser et al. |
| 2007/0035917 A1 | 2/2007 | Hotelling et al. |
| 2007/0064406 A1 | 3/2007 | Beart |
| 2007/0120752 A1 | 5/2007 | Takasu |
| 2007/0182367 A1 | 8/2007 | Partovi |
| 2007/0188284 A1 | 8/2007 | Dobbs |
| 2007/0246546 A1 | 10/2007 | Yoshida |
| 2007/0290654 A1 | 12/2007 | Govari et al. |
| 2008/0133918 A1 | 6/2008 | You et al. |
| 2008/0196086 A1 | 8/2008 | Shintani et al. |
| 2008/0231537 A1 | 9/2008 | Rofougaran et al. |
| 2008/0278894 A1 | 11/2008 | Chen et al. |
| 2009/0001932 A1 | 1/2009 | Kamijo et al. |
| 2009/0001941 A1 | 1/2009 | Hsu et al. |
| 2009/0008148 A1 | 1/2009 | Mashino |
| 2009/0069869 A1 | 3/2009 | Stouffer et al. |
| 2009/0088077 A1 | 4/2009 | Brown et al. |
| 2009/0106567 A1 | 4/2009 | Baarman |
| 2009/0170433 A1 | 7/2009 | Rhodes et al. |
| 2009/0212637 A1 | 8/2009 | Baarman et al. |
| 2009/0212737 A1 | 8/2009 | Johnson et al. |
| 2010/0007449 A1 | 1/2010 | Tait et al. |
| 2010/0021176 A1 | 1/2010 | Holcombe et al. |
| 2010/0045269 A1 | 2/2010 | LaFranchise et al. |
| 2010/0070219 A1 | 3/2010 | Azancot et al. |
| 2010/0076524 A1 | 3/2010 | Forsberg et al. |
| 2010/0081377 A1 | 4/2010 | Corbridge et al. |
| 2010/0081473 A1 | 4/2010 | Chatterjee et al. |
| 2010/0081483 A1 | 4/2010 | Chatterjee et al. |
| 2010/0083012 A1 | 4/2010 | Corbridge et al. |
| 2010/0121965 A1 | 5/2010 | Chatterjee |
| 2010/0131691 A1 | 5/2010 | Chatterjee et al. |
| 2010/0146308 A1 | 6/2010 | Gioscia et al. |
| 2010/0156193 A1 | 6/2010 | Rhodes et al. |
| 2010/0172090 A1 | 7/2010 | Chatterjee |
| 2010/0177476 A1 | 7/2010 | Hotelling et al. |
| 2010/0194336 A1 | 8/2010 | Azancot et al. |

FOREIGN PATENT DOCUMENTS

| | | |
|---|---|---|
| FR | 2601161 A1 | 1/1988 |
| GB | 2389720 B | 9/2005 |
| GB | 2399466 B | 11/2005 |
| GB | 2389767 B | 4/2006 |
| JP | 09-259241 A | 10/1997 |
| JP | 11-354348 A | 12/1999 |
| JP | 3161388 B2 | 2/2001 |
| KR | 10-0836634 B1 | 6/2008 |
| WO | WO 95/03686 A1 | 2/1995 |
| WO | WO 2005/0248651 A2 | 3/1995 |
| WO | WO 2004/098079 A1 | 11/2004 |
| WO | WO 2007/034421 A2 | 3/2007 |
| WO | WO 2008/033670 A2 | 3/2008 |
| WO | WO 2008/044875 A1 | 4/2008 |
| WO | WO 2008/133806 A1 | 11/2008 |
| WO | WO 2009/057771 A1 | 5/2009 |
| WO | WO 2010/005324 A1 | 1/2010 |
| WO | WO 2010/062198 A1 | 6/2010 |
| WO | WO 2010/068062 A2 | 6/2010 |
| WO | WO 2010/068062 A3 | 7/2010 |
| WO | WO 2010/091269 A1 | 8/2010 |

OTHER PUBLICATIONS

U.S. Appl. No. 12/975,335, filed Dec. 21, 2010, Oh et al.
U.S. Appl. No. 12/987,940, filed Jan. 10, 2011, Chatterjee et al.
Non-Final Office Action mailed Nov. 3, 2010 in U.S. Appl. No. 12/478,616 12 pgs.
U.S. Appl. No. 11/430,786, filed May 8, 2006, Baraban et al.
U.S. Appl. No. 12/628,401, filed Dec. 1, 2009, Chatterjee.
U.S. Appl. No. 12/840,241, filed Jul. 20, 2010, Chatterjee.
U.S. Appl. No. 29/323,688, filed Aug. 28, 2008, Matsuoka.
Final Office Action mailed Jan. 8, 2009 in U.S. Appl. No. 11/430,786.
Final Office Action mailed Oct. 25, 2004 in U.S. Appl. No. 09/861,658 10 pgs.
Final Office Action mailed Jul. 9, 2007 in U.S. Appl. No. 11/430,786.
Final Office Action mailed Jul. 19, 2010 in U.S. Appl. No. 11/430,786.
Final Office Action mailed Dec. 30, 2009 in U.S. Appl. No. 11/430,786.

Hui et al., "A New Generation of Universal Contactless Battery Charging Platform for Portable Consumer Electronic Equipment," IEEE Trans Power Electronics, 20(3):620-627 (2005).

International Search Report and Written Opinion dated Jul. 21, 2010 in International Application No. PCT/US2009/068328.

International Search Report and Written Opinion dated Jul. 28, 2010 in International Application No. PCT/US2009/068332.

International Search Report and Written Opinion dated Aug. 20, 2010 in International Application No. PCT/US2009/069847.

International Search Report and Writen Opinion dated Aug. 31, 2010 in International Application No. PCT/US2010/020054.

International Search Report and Written Opinion dated Apr. 20, 2010 in International Application No. PCT/US2009/055928.

Kean, Steven, "Powermat Portable Wireless Charging Mat", pp. 1-12 dwnloaded from http://www.bigbruin.com/content/powermat_1 on Sep. 29, 2010.

Liang et al., "An implantable bi-directional wireless transmission system for transcutaneous biological signal recording," Physiol. Meas. 26:83-97 (2005).

Mel, B. W. et al., "Tablet: Personal Computer in the Year 2000", Communications of the Association for Computing machinery, New Your, NY vol. 31, No. 6, Jun. 1, 1988, 639-646 XP000047633ISSN: 0001-0782.

Non-Final Office Action mailed Mar. 24, 2010 in U.S. Appl. No. 11/430,786.

Non-Final Office Action mailed Jul. 25, 2008 in U.S. Appl. No. 11/430,786.

Non-Final Office Action mailed Sep. 30, 2010 in U.S. Appl. No. 11/430,786 7 pgs.

Non-Final Office Action mailed Jan. 25, 2008 in U.S. Appl. No. 11/430,786.

Non-Final Office Action mailed Oct. 5, 2006 in U.S. Appl. No. 11/430,786.

Non-Final Office Action mailed Apr. 22, 2004 in U.S. Appl. No. 09/861,658 7 pgs.

Non-Final Office Action mailed Apr. 7, 2005 in U.S. Appl. No. 09/861,658 11 pgs.

Non-Final Office Action mailed Jun. 11, 2009 in U.S. Appl. No. 11/430,786.

Notice of Allowance mailed Jan. 9, 2006 in U.S. Appl. No. 09/861,658 12 pgs.

Opticon Users manual DWT 7133, Nov. 2000.

International Search Report and Writen Opinion dated Feb. 23, 2011 in International Application No. PCT/US2010/042779.

* cited by examiner

POWER BRIDGE CIRCUIT FOR BI-DIRECTIONAL INDUCTIVE SIGNALING

RELATED APPLICATIONS

This application claims benefit under 35 U.S.C. 119(e) of co-pending and commonly owned U.S. Provisional Application No. 61/227,413 entitled "WIRELESS SIGNAL INTERFACE AND DOCK FOR WIRELESS CHARGING AND COMMUNICATION," filed on Jul. 21, 2009; the aforementioned application being hereby incorporated by reference.

This application is also a continuation-in-part of U.S. patent application Ser. No. 12/628,401, entitled POWER BRIDGE CIRCUIT FOR BI-DIRECTIONAL WIRELESS POWER TRANSMISSION, filed Dec. 1, 2009; which claims priority to U.S. Provisional Application No. 61/227,423, filed Jul. 21, 2009; both of the aforementioned priority applications being hereby incorporated by reference.

TECHNICAL FIELD

The disclosed embodiments relate generally to the field of inductive signal interfaces. In particular, the disclosed embodiments relate to a power bridge circuit for bi-directional inductive signaling.

BACKGROUND

FIG. 1A illustrates a conventional, prior art H-bridge inverter circuit 110 for transferring power from a DC supply 120 to an AC load 115. The H-bridge inverter circuit 110 includes four switches 111-114. During the operation of the H-bridge inverter 110, the switches 111-114 turn on and off in pairs to deliver an AC current to the AC load 115. For example, at one instance, switches 111 and 114 are turned on, while the switches 112 and 113 are turned off. Current flows from DC power supply 120 through switch 111, to the AC load 115, through the switch 114, and to a ground voltage or a negative supply voltage. At another instance, switches 111 and 114 are turned off, switches 112 and 113 are turned on. During this instance, the current flows from the DC supply 120 through the switch 113, to the AC load 115, through the switch 112, and to the ground voltage or the negative supply voltage. By altering the direction of the current flow, the H-bridge inverter is configured to deliver an AC current from the DC supply 120 to the AC load 115.

FIG. 1B illustrates a conventional, prior art sync bridge circuit 130 for transferring power from an AC supply 135 to a DC load 140. The sync bridge circuit 130 includes four switches 131-134. The sync bridge circuit 130 receives an AC current from the AC supply 135, and the switches 131-134 of the sync bridge circuit 130 turn on and off in pairs to deliver a DC current to the DC load 140.

BRIEF DESCRIPTION OF THE DRAWINGS

The features and advantages of the present invention are illustrated by way of example and are by no means intended to limit the scope of the present invention to the particular embodiments shown, and in which.

DETAILED DESCRIPTION

Figure 1A:
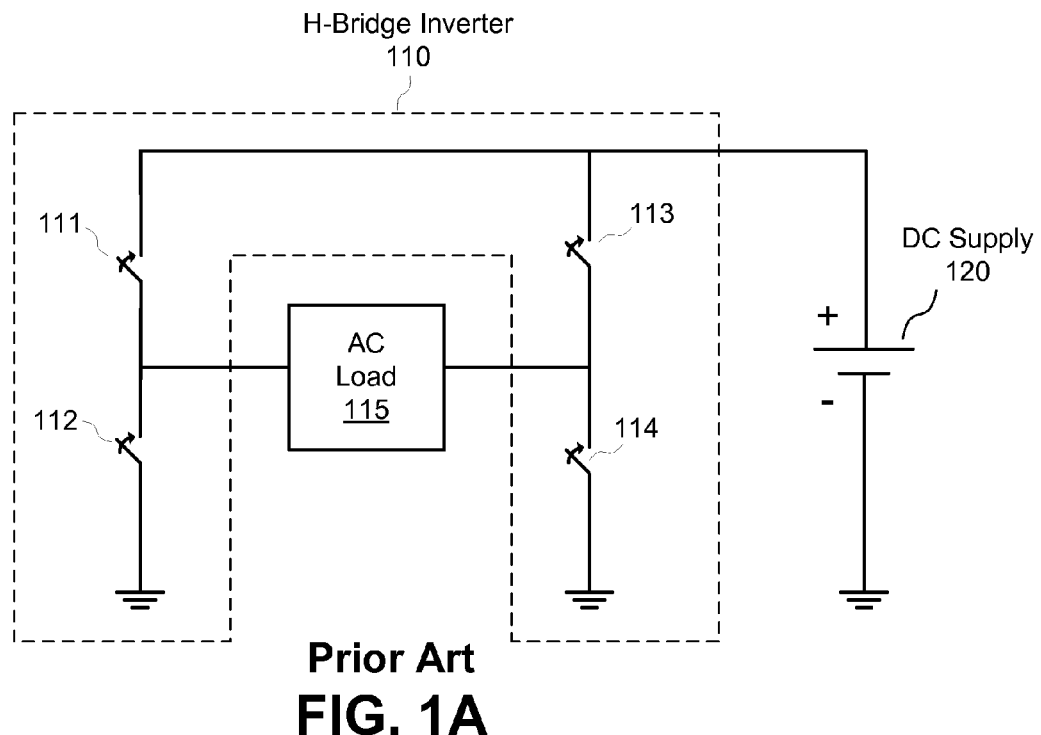
FIG. 1A illustrates a prior art H-bridge inverter circuit for delivering power from a DC power supply to an AC load.
Figure 1B:
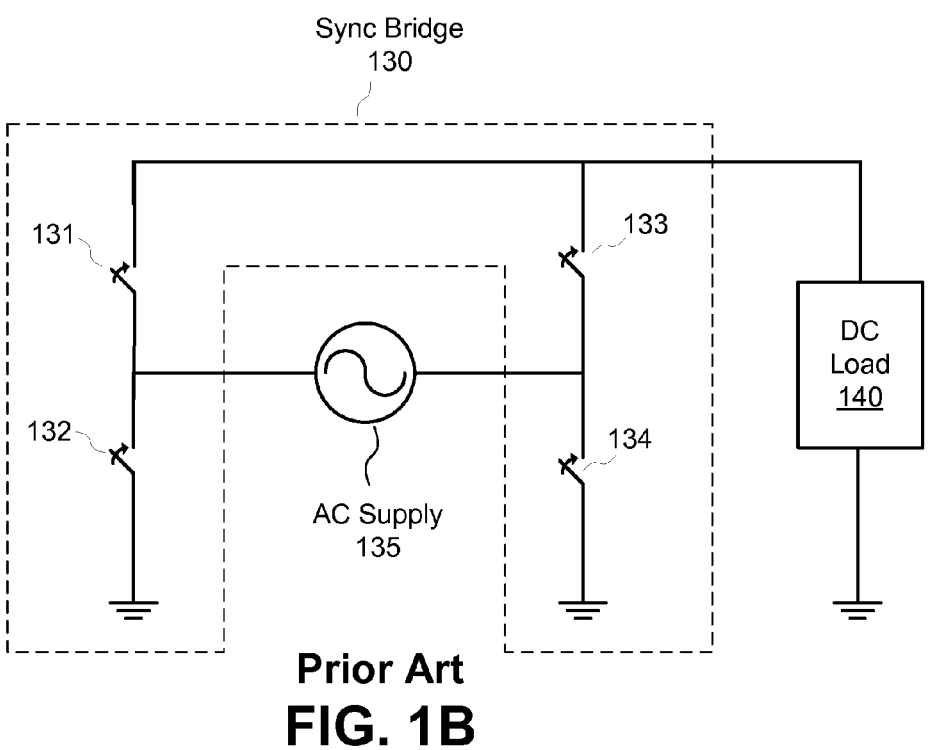
FIG. 1B illustrates a prior art synchronous bridge rectifier circuit for delivering power from an AC power supply to a DC load.

Embodiments described herein include a bi-directional inductive signal interface that is operable to either inductively transmit power or to inductive receive power. Embodiments described herein can be implemented in mobile devices, docking stations, accessory devices, printers, or any other electronic devices and allow these devices to inductively transfer power without the need for cables or exposed connectors.

According to some embodiments, an inductive signal interface is provided that is capable of dynamically switching (i.e. without the need to power off or reconfigure the inductive signal interface) a mode of operation to act as either a power transmitter or a power receiver. Accordingly, an electronic device that includes embodiments of the inductive signal interface is configurable to dynamically switch between acting as an inductive power transmitter and an inductive power receiver. In one implementation, for example, a mobile phone device is able to (i) receive power inductively through a docking station, then (ii) without powering off or undergoing reconfiguration, the mobile phone device to inductively signal power to another device, such as a telephony accessory device (e.g. a wireless headset).

Furthermore, by being bi-directional, the same inductive signal interface may be used in different electronic devices to minimize cost and complexity. For example, a mobile phone device can utilize the same inductive signal interface as a docking station. Furthermore, the mobile phone device is not only enabled to receive power through the inductive signal interface but can be used as a power source for an accessory device inductively coupled to the mobile phone device.

According to an embodiment, the inductive signal interface is configured to automatically switch between (i) a power-transmit mode for transmitting power to an inductively coupled device, and (ii) a power-receive mode for receiving power from an inductively coupled device.

In certain embodiments, the inductive signal interface includes a coil assembly and a bridge circuit comprising a plurality of electronically controlled switches that are individually controlled by circuitry within the inductive signal interface. The coil assembly includes one or more inductive coils for forming an inductive link with the inductively coupled device. By individually operating the electronically controlled switches in the power-transmit mode, the inductive signal interface is capable of receiving a direct current (DC) input signal and transmitting an alternating current (AC) output signal to the coil assembly so that the AC output signal may be transmitted inductively to a coupled device. Conversely, in the power receive mode, the inductive signal interface is capable of receiving an AC input signal from an inductively coupled device through the coil assembly and transmitting a DC output signal. The DC output signal may be used to charge a battery, or to provide power one or more elements such as a CPU or a display module. The inductive signal interface can also selectively enter an idle mode. During the idle mode, the inductive signal link may be dropped by inductive signal interface. The inductive signal link may be reformed once the inductive signal interface enters either the power-transmit or the power-receive modes.

According to an embodiment, the inductive signal interface is capable of automatically determining a mode of operation between the power-transmit mode, the power-receive mode, and the idle mode based on one or more of the following: i) an inductive signal generated by the inductively coupled device, or ii) an input signal received from circuitry coupled to the inductive signal interface. Upon determining the mode of operation, the inductive signal interface automatically switches to the determined mode of operation.

For the purposes of the disclosure, the term "coupled to" refers to conductive coupling through one or more conductor signal lines, whereas the term "inductively coupled to" refers to inductive coupling without the use of conductor signal lines.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many smart phones and feature phones), and magnetic memory. Computers, terminals, network enabled devices (e.g. mobile devices such as cell phones) are all examples of machines and devices that utilize processors, memory, and instructions stored on computer-readable mediums.

Figure 2A:
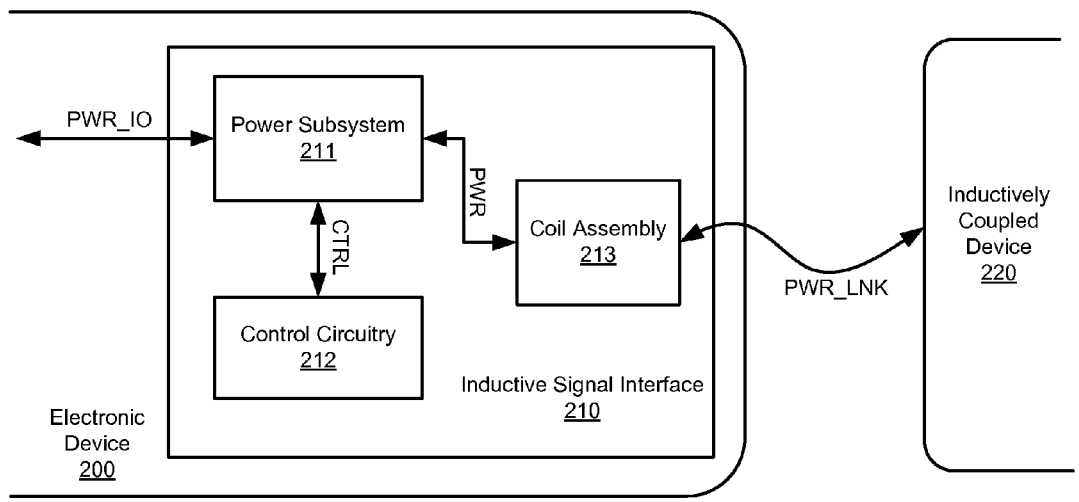
FIG. 2A is a block diagram of one embodiment of a wireless signal interface.

FIG. 2A is a block diagram of an inductive signal interface, according to an embodiment. An inductive signal interface 210 is implemented within an electronic device 200 and is coupled to elements within the electronic device 200 via a power bus PWR_IO. The inductive signal interface 210 is configured to form an inductive signal link PWR_LNK with an inductively coupled device 220 to transmit or receive an inductive power signal. The inductive signal interface 210 includes a power subsystem 211, control circuitry 212, and a coil assembly 213. The coil assembly 213 inductively couples with the device 220 to form the inductive signal link PWR_LNK. The inductively coupled device 220 may be a device configured similarly as the electronic device 200. More specifically, it may include an embodiment of the inductive signal interface 210 used for forming the inductive signal link PWR_LNK. For certain embodiments, the inductive signal interface 210 operates alternatively in a power transmit mode to inductively transfer power or in a power receive mode to inductively receive power over the inductive signal link PWR_LNK. The inductive signal interface 210 may also enter an idle mode where no power transfer takes place.

According to one embodiment, the electronic device 200 is implemented as a dedicated docking station which operates as a power transmitter to inductively provide power to the inductively coupled device 220. For this embodiment, the inductive signal interface 210 operates either in the power transmit mode or in the idle mode. In alternative implementations, the electronic device 200 corresponds to a device that is capable of operating in a power supply mode to supply power to another device. For example, the inductive signal interface 210 may be incorporated into devices such as laptops or personal computers, printers, display systems and other devices. Furthermore, the inductive signal interface 210 may be supplied as a component of a larger device. For example, inductive signal interface 210 may correspond to a modular device that can be attached to and incorporated into the use of another device. Alternatively, the inductive signal interface 210 may be provided as an integrated feature of another device in order to provide an inductive 'landing pad' for another device to receive power and/or transfer data.

According to another embodiment, the electronic device 200 operates as a power receiver. For example, the electronic device 200 could be a Bluetooth accessory device that receives power inductively from the inductively coupled device 220. For this embodiment, the inductive signal interface 210 operates either in the power receive mode or in the idle mode.

In other embodiments, the electronic device 200 is a mobile electronic device such as a mobile phone or a mobile computing device. For these embodiments, the inductive signal interface 210 dynamically switches a mode of operation to selectively operate in the power transmit mode, the power receive mode, or the idle mode. The inductive signal interface 210 may be configured to automatically determine the mode of operation based on the presence of the inductive signal link PWR_LNK, and/or one or more signals from elements within the electronic device 200.

The power subsystem 211 is coupled to elements within the electronic device 200 via the power bus PWR_IO to receive or transmit a power signal to and from those elements. The power subsystem 211 is further coupled to the control circuitry 212 via a signal bus CTRL and to the coil assembly 213 via a power bus PWR. Through the signal bus CTRL, the power subsystem 211 transmits sense signals to and receives control signals from the control circuitry 212. The sense signals include a first current sense signal indicating a current propagating over the power bus POWER_IO, a second current sense signal indicating a current between the power subsystem 211 and the coil assembly 213. The sense signals may also include a voltage sense signal indicating a voltage variation on the power bus PWR. The voltage sense signal may indicate the presence of the inductive signal link PWR_LNK and may be used by the control circuitry 212 to determine a mode of operation for the inductive signal interface 210. The power subsystem 211 includes circuitry to allow the inductive signal interface 210 to act both as an inductive power transmitter and as an inductive power receiver. Through the power bus PWR, the power subsystem 211 transmits or receives a power signal to or from the coil assembly 213.

The control circuitry 212 determines a mode of operation for the inductive signal interface 210. The mode of operation can be any one of: i) the power transmit mode, ii) the power receive mode, or iii) the idle mode. Upon determining the mode of operation, the control circuitry 212 transmits control signals to the power subsystem 211 via the signal bus CTRL to configure the power subsystem 211 to operate in accordance with the determined mode of operation.

The control circuitry 212 automatically determines a mode of operation of the inductive signal interface 210 based on one or more of the following: i) the sense signals received from the power subsystem 211 via the signal bus CTRL, and ii) the one or more signals received from the electronic device 200. As previously described, the sense signals may indicate the presence of the inductive signal link PWR_LNK and in certain embodiments, the control circuitry 212 determines the mode of operation based, at least in part, by detecting the presence of the inductive signal link PWR_LNK through the sense signals. For example, in one embodiment, the control circuitry 212 determines the mode of operation to be the power receive mode after detecting the presence of the inductive signal link PWR_LNK through the sense signals. Although not shown in FIG. 2A, the control circuitry 212 may be further coupled to the electronic device 200 to receive one or more signals from the electronic device 200 to determine the mode of operation for the inductive signal interface 210. For example, in an embodiment wherein the electronic device 200 is a docking station, one or more signals from the docking station causes the control circuitry 212 to operate the inductive signal interface 210 in the power transmit mode. The inductive signal interface 210 is thus configurable to function under different modes of operation through a signal input from the electronic device 200, making the inductive signal interface 210 versatile and suitable for a variety of different applications without reconfiguration or redesign.

The coil assembly 213 includes one or more coils which inductively couples to coils on the inductively coupled device 220 (not shown) to form the one or more inductive links. The one or more coils within the coil assembly 213 may also couple to the inductively coupled device 220 using resonant inductive coupling (or otherwise referred to as magnetic resonance coupling or evanescent coupling). Resonant inductive coupling may be achieved using two similarly configured coils (one on the electronic device 200 and another on the inductively coupled device 220) that are highly resonant at the same frequency.

While the inductive signal interface 210 is operating in the power transmit mode, the power subsystem 211 receives an output power signal from the electronic device 200 via the power bus PWR_IO and transmits a processed output power signal to the coil assembly 213 via the power bus PWR. The power subsystem 211 may perform one or more signal processing functions on the input power signal to generate the processed output power signal. For some embodiments, the one or more signal processing function includes a conversion from a direct current (DC) power signal to an alternating current (AC) power signal. The coil assembly 213 receives the processed output power signal to generate an inductive output power signal to be transmitted via PWR_LNK to the inductively coupled device 220.

While the inductive signal interface 210 is operating in the power receive mode, the coil assembly 213 receives an inductive input power signal from the inductively coupled device 220 via PWR_LNK to generate an input power signal to the power subsystem 211. For some embodiments, the power subsystem 211 performs one or more signal processing functions on the input power signal to generate a processed input power signal which is transmitted via the power bus PWR_IO. According to one or more embodiments, the one or more signal processing functions include an AC to DC conversion. The processed input power signal may used by the electronic device 200 to charge a battery or to provide power to one or more circuit elements such as a CPU or a display module.

Figure 2B:
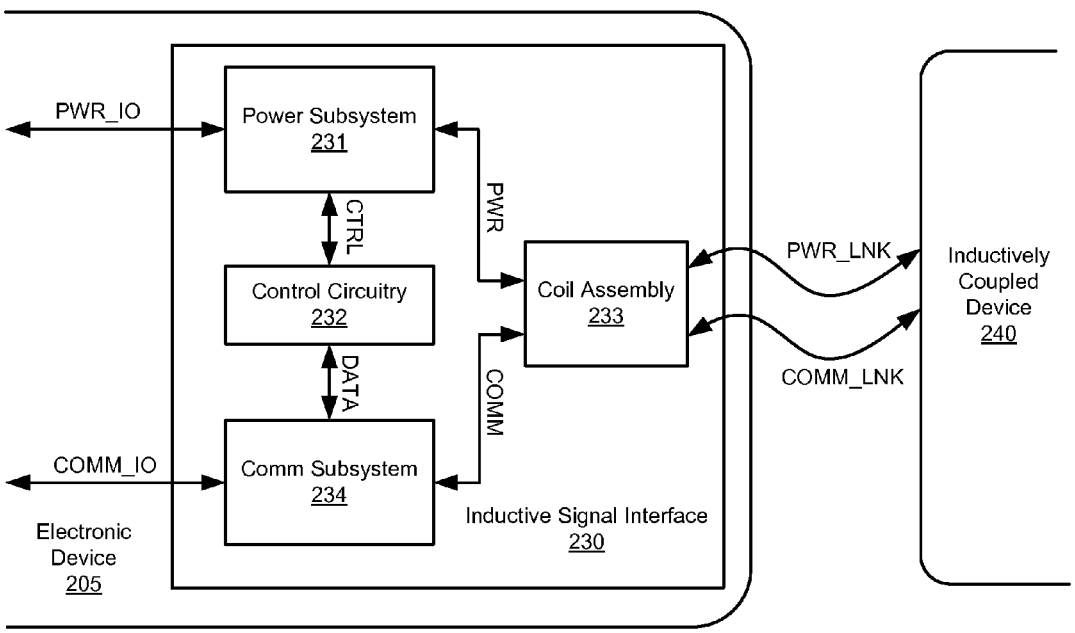
FIG. 2B is a block diagram of another embodiment of the wireless signal interface.

FIG. 2B is a block diagram of another embodiment of the inductive signal interface 230. The inductive signal interface 230 is a component of an electronic device 205 and provides the electronic device 205 the capability of bi-directional inductive power and data transfer with an inductively coupled device 240. The inductive signal interface 230 includes a power subsystem 231, control circuitry 232, a coil assembly 233, and a communications subsystem 234. The inductive signal interface 230 is coupled to other elements of the electronic device 205 via a power bus PWR_IO and a communication bus COMM_IO. The inductive signal interface 230 is configurable to form an inductive power link PWR_LNK and an inductive data link COMM_LNK with the inductively coupled device 240.

The inductive signal interface 230 is configurable to automatically determine and enter a mode of operation from a plurality of modes including: i) a power transmit mode, ii) a power receive mode, iii) a communication only mode, and iv) an idle mode. In the power transmit mode, the inductive signal interface 230 receives an input power signal via the power bus PWR_IO to generate an inductive power signal which is transmitted to the inductively coupled device 240 via the inductive power link PWR_LNK. In the power receive mode, the inductive signal interface 230 receives an inductive power signal from the inductively coupled device 240 through the inductive power link PWR_LNK to generate an output power signal. The output power signal is transmitted through the power bus PWR_IO. The inductive signal interface 230 is configured to perform bi-directional inductive data transfer with the inductively coupled device 240 through the inductive data link COMM_LNK in both the power transmit and the power receive modes.

Signals transmitted over COMM_LNK may correspond to data packets transferred between the electronic device 205 and the inductively coupled device 240. For example, in one embodiment where both the electronic device 205 and the inductively coupled device 240 are mobile phones, one or more contact records may be transferred as data packets between the mobile phones via COMM_LNK.

In some embodiments, COMM_LNK is established first between the two devices 205 and 240, prior to the establishment of PWR_LNK. The handshaking between the two devices 205 and 240 determine an operating mode for each respective device. Signals transmitted over COMM_LNK may provide the electronic device 205 identification information of the inductively coupled device 240 and allows the inductive signal interface 230 to determine an appropriate mode of operation. For example, data transmitted over COMM_LNK from the inductively coupled device 240 may indicate that the inductively coupled device 240 is a docking station. Accordingly, the inductive signal interface 230 determines to enter the power receive mode to inductively receive power from the docking station.

In certain embodiments, COMM_LNK is used by the inductive signal interface 230 to detect the presence of a device configured to be inductively coupled to the electronic device 205, such as inductively coupled device 240. By transmitting a signal over COMM_LNK and monitoring COMM_LNK for a response, the inductive signal interface 230 can detect the presence of another device that is configured for handshaking via the inductive data link COMM_LNK. Accordingly, COMM_LNK may be used to initiate handshaking between the electronic device 205 and the inductively coupled device 240. The handshaking may be performed in accordance with an established protocol such as described in U.S. patent application Ser. No. 12/478,766, filed Jun. 4, 2009 and incorporated by reference herein. Signals transmitted over COMM_LNK may also correspond with commands and requests between the devices 205 and 240. These commands and requests may also be in accordance with established protocols such as the PALM TOUCHSTONE protocol.

The power subsystem 231 is coupled to the power bus PWR_IO which functions as either a power input or power output depending on the mode of operation of the inductive signal interface 230. The power bus PWR_IO is coupled to other elements of the electronic device 205. More specifically, PWR_IO is coupled to circuitry and signal lines within the electronic device 205 to enable the power subsystem 231 to transmit a power signal to the electronic device 205 to charge a battery within the electronic device 205 or to provide power to various elements of the electronic device 205 such as a CPU or a display module. In certain embodiments, the power subsystem 231 is capable of performing both of those tasks simultaneously. The power subsystem 231 can also receive a power signal from the electronic device 205 via the power signal line PWR_IO. In some instances, the received power signal originates from the battery within the electronic device 205, and in other instances, the received power signal could originate from a power source coupled to the electronic device 205 such as a wall charger. For example, in an embodiment wherein the electronic device 205 is a docking station, the electronic device 205 is coupled to a wall socket via a charging cable or a wall charger and transmits a power signal to the power subsystem 231 that originates from the wall socket.

Control circuitry 232 is coupled to the power subsystem 231 via a signal bus CTRL. Signals such as sense signals are also transmitted via the signal bus CTRL from the power subsystem 231 to the control circuitry 232. In some embodiments, the control circuitry 232 is configured to automatically determine a mode of operation of the inductive signal interface 230 based on one or more of the following: i) an identification of the inductively coupled device 240, ii) a detection of the inductive signal links PWR_LNK or COMM_LNK, iii) one or more signals from the electronic device 205. Although not shown in FIG. 2B, the control circuitry may receive one or more signals from the electronic device 205. Detection of the inductive signal link PWR_LNK may be accomplished by sensing voltage variations in the sense signals received from the power subsystem 231. The control circuitry 232 is also configured to transmit signals that control the operation of the power subsystem 231. These control signals are also transmitted via the signal bus CTRL from the control circuitry 232 to the power subsystem 231.

The communications subsystem 234 is coupled to the control circuitry via a signal bus DATA. Signals corresponding to for example identification information of the inductively coupled device 240 may be transmitted from the communications subsystem 234 to the control circuitry 232. Other signals corresponding to commands or requests from the inductively coupled device 240 may also be transmitted from the communications subsystem 234 to the control circuitry 232. The communications subsystem 234 includes circuitry that perform signal processing functions to facilitate the transmission and reception of data signals over the inductive signal link COMM_LNK. In some embodiments, these signal processing functions include modulation of a carrier signal by output data signals and demodulation of input data signals over COMM_LNK. The communications subsystem 234 is also coupled to the communication bus COMM_IO to transmit or receive communication data. For example, the communications subsystem 234 may receive communication data from the electronic device 205 and propagates the communication data to the coil assembly 233 for transfer to the inductively coupled device 240.

The coil assembly 233 is coupled to the power subsystem 231 via a power bus PWR and to the communications subsystem via a communication bus COMM. The coil assembly 233 receives or transmits a power signal over the power bus PWR and receives or transmits a data signal over the communication bus COMM. The coil assembly 233 is configured to form one or more inductive links such as PWR_LNK and COMM_LNK with the inductively coupled device 240. A power signal may be transmitted or received by the coil assembly 233 via PWR_LNK and one or more data signals may be transmitted or received by the coil assembly 233 via COMM_LNK.

The coil assembly 233 includes one or more coils which inductively couples to coils on the inductively coupled device 240 to form the one or more inductive links. The one or more coils within the coil assembly 233 may also couple to the inductively coupled device 240 using resonant inductive coupling. Resonant inductive coupling may be achieved using two similarly configured coils (one on the electronic device 205 and another on the inductively coupled device 240) that are highly resonant at the same frequency.

The coil assembly 233 may include a power coil for forming PWR_LNK and a communication coil for forming COMM_LNK. The power and communication coils may be arranged such that they are separated by an air gap. Alternatively the coil assembly 233 may include a coil for forming both PWR_LNK and COMM_LNK. In such an embodiment, signals transmitted via PWR_LNK (e.g. a power signal) and COMM_LNK (e.g. data signals) may be of different frequencies. The communications subsystem 234 may include modulation circuitry to modulate outgoing data signals transmitted via COMM_LNK and demodulation circuitry to demodulate incoming data signals received via COMM_LNK in accordance with this and other similar embodiments.

While the inductive signal interface 230 is operating in the power transmit mode, the power subsystem 231 receives an output power signal from the electronic device 205 via the power bus PWR_IO and transmits a processed output power signal to the coil assembly 233 via the power bus PWR. The power subsystem 231 may perform one or more signal processing functions on the input power signal to generate the processed output power signal. For some embodiments, the one or more signal processing function includes a conversion from a direct current (DC) power signal to an alternating current (AC) power signal. The coil assembly 233 receives the processed output power signal to generate an inductive output power signal to be transmitted via PWR_LNK to the inductively coupled device 240.

While the inductive signal interface 230 is operating in the power receive mode, the coil assembly 233 receives an inductive input power signal from the inductively coupled device 240 via PWR_LNK to generate an input power signal to the power subsystem 231. For some embodiments, the power subsystem 231 performs one or more signal processing functions on the input power signal to generate a processed input power signal which is transmitted via the power bus PWR_IO. According to one or more embodiments, the one or more signal processing functions include an AC to DC conversion. The processed input power signal may used by the electronic device 205 to charge a battery or to provide power to one or more circuit elements such as a CPU or a display module.

The inductive signal interface 230 is also capable of operating in a communications only mode wherein the inductive link PWR_LNK may be dropped by the inductive signal interface 230. The inductive signal interface 230 may also enter an idle mode. In such a mode, both inductive links PWR_LNK and COMM_LNK may be dropped by the inductive signal interface 230. The inductive links may be reformed when the inductive signal interface leaves the idle mode.

Figure 3:
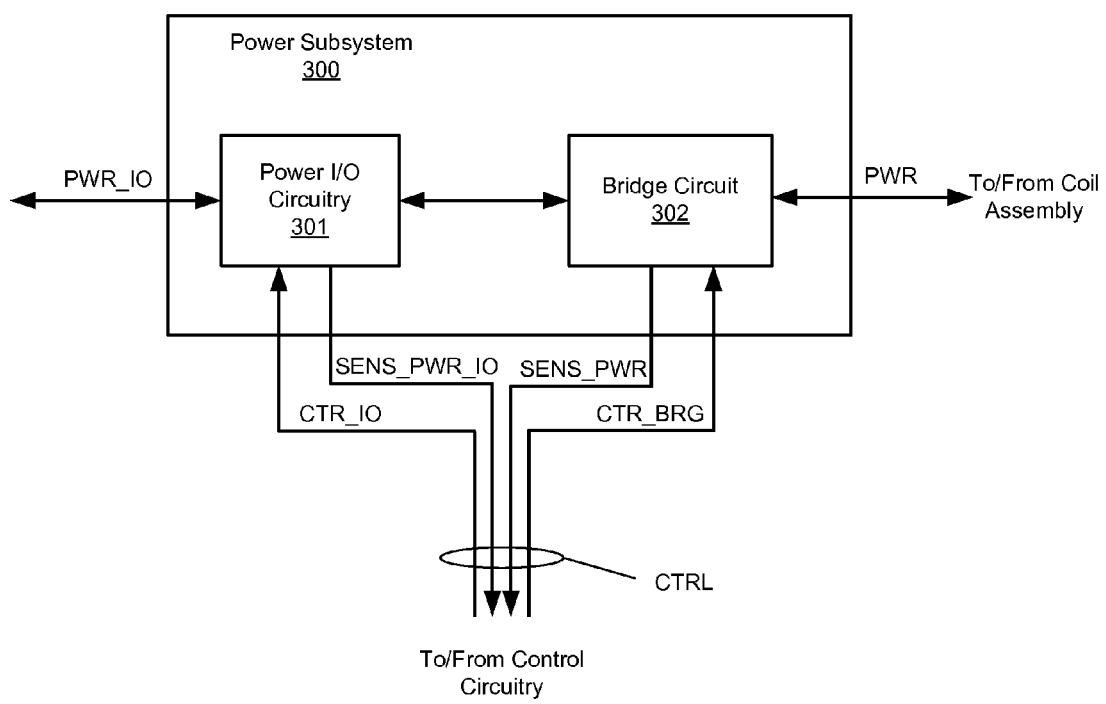
FIG. 3 is a block diagram of one embodiment of the power subsystem of FIGS. 2A and 2B.

FIG. 3 is a block diagram of an embodiment of the power subsystem 211 of FIG. 2A or the power subsystem 231 of FIG. 2B. As described with respect to FIGS. 2A and 2B, power subsystem 300 is configured to route a power signal to and from a coil assembly coupled to the power subsystem 300. The power subsystem 300 is coupled to a first power bus PWR_IO and a second power bus PWR to transmit and receive power signals. Power subsystem 300 is also coupled to a signal bus CTRL. In the embodiment depicted, the signal bus CTRL includes signal lines CTR_IO, CTR_BRG, SENS_PWR_IO, and SENS_PWR. The power subsystem 300 includes power input/output (I/O) circuitry 301 coupled to PWR_IO and a bridge circuit 302 coupled to PWR. The power I/O circuitry 301 and the bridge circuit 302 are coupled together by another power bus.

The power subsystem 300 is fully bi-directional in that it may receive an input power signal via PWR_IO to generate an output power signal via PWR or alternatively, it may receive a power signal via PWR to generate an output power signal via PWR_IO. Referring back to FIG. 2A and 2B, PWR_IO may be coupled to other circuitry within an electronic device in which the power system 300 is implemented such as electronic device 205, PWR may be coupled to a coil assembly such as coil assembly 233, and CTRL may be coupled to control circuitry such as control circuitry 232.

The power I/O circuitry 301 includes switches, filters, and sense elements (not shown) to properly direct a power signal from PWR_IO to the bridge circuit 302 or vice-versa. The power I/O circuitry 301 generates one or more sense signals SENS_PWR_IO which is transmitted via the signal bus CTRL. The sense signals SENS_PWR_IO could be indicative of a voltage level within the power I/O circuit 301, a current level of a power signal within the power I/O circuit 301, or both. The power I/O circuitry 301 receives one or more control signals CTRL_IO via the signal bus CTRL. The one or more control signals operate the switches within the power I/O circuitry 301 to properly direct power signals flowing through the power I/O circuitry 301.

The bridge circuit 302 includes one or more electronically controlled switches (not shown) to perform signal processing functions on a power signal. For some embodiments, the bridge circuit 302 is configured to selectively perform AC to DC conversion or DC to AC conversion based on control signals CTRL_BRG received from via the signal bus CTRL. The control signals CTRL_BRG is indicative of a mode of operation of an inductive signal interface in which the power subsystem 300 is implemented (such as inductive signal interface 205 of FIG. 2B). The bridge circuit 302 generates sense signals SENS_PWR which is transmitted via the signal bus CTRL. The sense signals SENS_PWR could be indicative of a voltage variation within the bridge circuit 302, a current level of a power signal within the bridge circuit 302, or both.

Figure 4A:
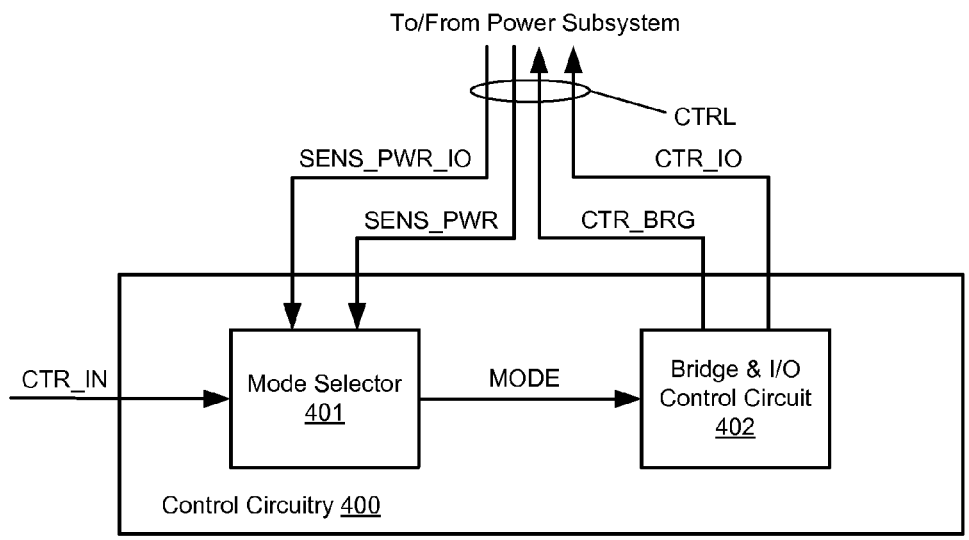
FIG. 4A is a block diagram of one embodiment of the control circuitry of FIGS. 2A and 2B.

FIG. 4A illustrates control circuitry, according to an embodiment. Control circuitry 400 may be an embodiment of the control circuitry 212 of FIG. 2A. As described with respect to FIG. 2A, the control circuitry 400 is configured to receive sense signals from a bridge circuit and power I/O circuitry and in response thereto, the control circuitry 400 generates and transmits one or more control signals to the bridge circuit and the power I/O circuitry. Control circuitry 400 has inputs to receive input control signal CTR_IN and sense signals SENS_PWR_IO and SENS_PWR, and has outputs to transmit signals control signals CTR_IO and CTR_BRG. Control circuitry 400 includes a mode selector 401 and a bridge and I/O control circuit 402. Referring back to FIG. 2A, signals SENS_PWR_IO, SENS_PWR, CTR_BRG, and CTR_IO are all transmitted or received via a signal bus CTRL to and from the power subsystem 211.

Mode selector 401 receives the input control signal CTR_IN and the sense signals SENS_PWR_IO and SENS_PWR and generates signal MODE indicating a mode of operation of an inductive signal interface such as the inductive signal interface 230 of FIG. 2B. Signal MODE may indicate a power transmit mode, a power receive mode, or an idle mode of the inductive signal interface. According to one embodiment, the input control signal CTR_IN is a control signal generated by an electronic device such as electronic device 205 of FIG. 2B. The input control signal CTR_IN may indicate a command from the electronic device for the inductive signal interface to operate in a specific mode of operation. For example, when the inductive signal interface is implemented within a docking station, CTR_IN may indicate to the mode selector 401 to generate a signal indicating the mode of operation to be the power transmit mode. Sense signals SENS_PWR_IO and SENS_PWR are received from power I/O circuitry (such as power I/O circuitry 301 of FIG. 3) and a bridge circuit (such as bridge circuit 302 of FIG. 3), respectively. Each may indicate a current or voltage level within those circuit elements.

Bridge and I/O control circuit 402 receives the signal MODE and in accordance therewith generates control signals CTR_BRG and CTR_IO that control the operations of the bridge circuit and the power I/O circuitry, respectively.

Figure 4B:
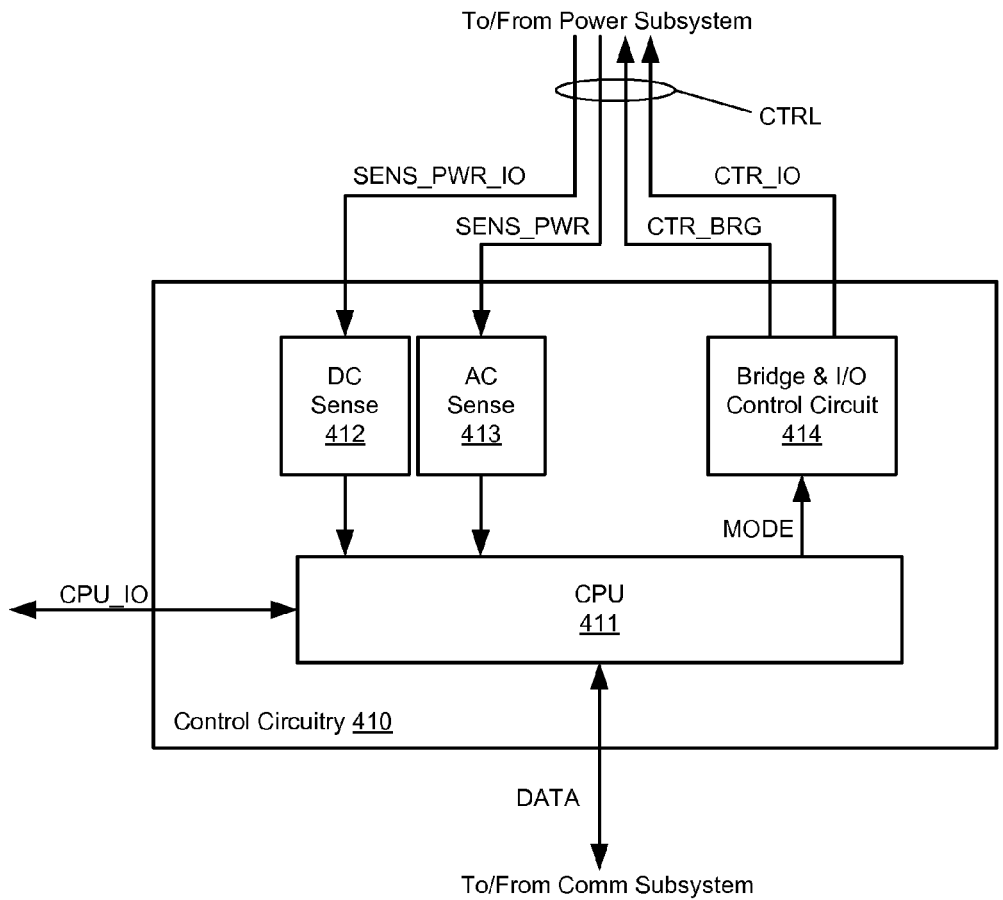
FIG. 4B is a block diagram of another embodiment of the control circuitry of FIGS. 2A and 2B.

FIG. 4B illustrates another embodiment of control circuitry. Control circuitry 410 may be an embodiment of the control circuitry 232 of FIG. 2B. As described with respect to FIG. 2B, the control circuitry 410 is configured to receive sense signals from a bridge circuit and power I/O circuitry and in response thereto, the control circuitry 410 generates and transmits one or more control signals to the bridge circuit and the power I/O circuitry. The control circuitry 410 is also configured to transmit and receive data signals via a communication subsystem. The control circuitry 410 has inputs to receive sense signals SENS_PWR_IO and SENS_PWR, and has outputs to transmit signals control signals CTR_IO and CTR_BRG. Control circuitry 410 also has bi-directional ports coupled to signal buses CPU_IO and DATA. Referring back to FIG. 2B, signals SENS_PWR_IO, SENS_PWR, CTR_BRG, and CTR_IO are transmitted or received via a signal bus CTRL to and from the power subsystem 231, and signal bus DATA is coupled to the communications subsystem 234. Control circuitry 410 includes a CPU 411, a DC sense 412, an AC sense 413, and bridge and I/O control circuit 414.

The CPU 411 is coupled to signal buses CPU_IO and DATA. The signal bus CPU_IO may be coupled to elements within an electronic device such as electronic device 205 of FIG. 2B to allow the CPU 411 to communicate with the electronic device. According to one embodiment, the signal bus DATA is coupled to a communication system such as the communication system 234 of FIG. 2B. The DC sense element 412 is coupled between the input sense signal line SENS_PWR_IO and the CPU. The AC sense element 413 is coupled between the input sense signal line SENS_PWR and the CPU 411. The bridge and I/O control circuit 414 is coupled between the CPU 411 and the output control signal lines CTR_BRG and CTR_IO.

DC sense element 412 and AC sense element 413 receive sense signals SENS_PWR_IO and SENS_PWR, respectively. Sense signal SENS_PWR_IO indicates a current flow or voltage level of on corresponding DC signal line while sense signal SENS_PWR indicates a current flow or voltage level on a corresponding AC signal line. The AC and DC signal lines are external to the control circuitry 410. The DC sense element 412 makes one or more determinations including a determination of whether a DC signal is detected on the corresponding DC signal line. The AC sense element 413 makes one or more determinations include a determination of whether an AC signal is detect on the corresponding AC signal line. The DC sense element 412 and AC sense element 413 transmit signals corresponding to those determinations to the CPU 411.

Using the determinations received from the AC and DC sense elements 413 and 412, the CPU 411 performs computations or operations to generate a MODE signal. According to some embodiments, the MODE signal corresponds with information including a mode of operation of an inductive signal interface such as the inductive signal interface 230 of FIG. 2B. The MODE signal is received by the bridge and I/O control circuit 414, and based on the MODE signal the bridge and I/O control circuit 414 generates control signals CTR_BRG and CTR_IO. According to one embodiment, the control signal CTR_BRG is outputted to a bridge circuit such as the bridge circuit 302 of FIG. 3 and controls the operation of the bridge circuit. According to another embodiment, the control signal CTR_IO is transmitted to power I/O circuitry such as the power I/O circuitry 301 of FIG. 3 and controls the operation of the control I/O circuitry.

Figure 5:
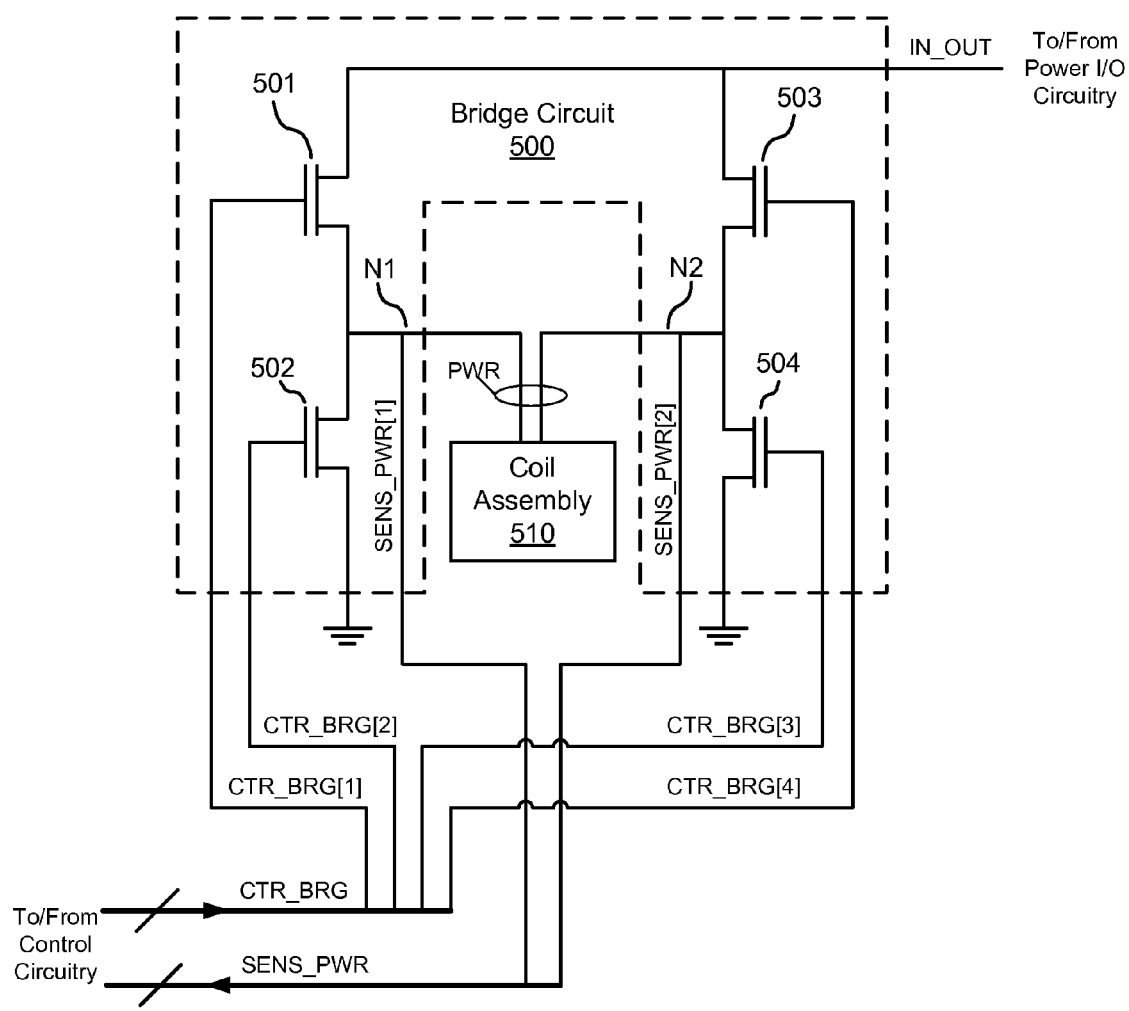
FIG. 5 is a circuit diagram of one embodiment of the bridge circuit of FIG. 3.

FIG. 5 illustrates a bridge circuit, according to an embodiment. Bridge circuit 500 may be an embodiment of the bridge circuit 302 of FIG. 3, and as described with respect thereto, the bridge circuit 500 is configured to convert an AC power signal from a coil assembly to a DC power signal, or vice-versa. Bridge circuit 500 as an I/O port coupled to a signal line IN_OUT to transmit or receive a power signal from the power I/O circuitry 301 of FIG. 3. The bridge circuit 500 is coupled to a coil assembly 510 through a signal bus PWR. Coil assembly 510 is an embodiment of the coil assembly 213 of FIG. 2A or coil assembly 233 of FIG. 2B. The bridge circuit 500 includes electrically controlled switches 501, 502, 503, and 504. Switch 501 is coupled between IN_OUT and a node N1, and switch 502 is coupled between node N1 and ground potential. Switch 503 is coupled between IN_OUT and a node N2, and switch 504 is coupled between node N2 and ground potential.

The signal bus PWR are coupled to nodes N1 and N2 and accordingly, the coil assembly 510 is coupled to the bridge circuit at node N1 and at node N2. Sense signals SENS_PWR [1] and SENS_PWR[2] are also coupled to nodes N1 and N2, respectively. SENS_PWR[1] and SENS_PWR[2] are transmitted via signal bus SENS_PWR to control circuitry 232 of FIG. 2B for example. SENS_PWR[1] and SENS_PWR[2] may be used to determine a voltage variation between nodes N1 and N2.

Each of the switches 501-504 receives a respective control signal from the control signal bus CTR_BRG. For example, switch 501 receives signal CTR_BRG[1] and switch 503 receives signal CTR_BRG[3]. Each of the control signals indicate whether a corresponding switch should be open or closed. When a switch is closed, no current flows through the switch and when the switch is open, the switch is conductive, allowing a current to flow through the two nodes coupled to the switch. The control signals CTR_BRG are generated by control circuitry such as the control circuitry 232 of FIG. 2B. The control signals CTR_BRG operate the switches 501-504 in manners that properly route a power signal from IN_OUT to the coil assembly and vice versa.

According to one embodiment, the electrically controlled switches 501, 502, 503, and 504 are implemented using metal-oxide semiconductor field effect transistors (MOSFETs). In such an embodiment, each of the MOSFETs receive a corresponding one of the control signals CTR_BRG[1 ... 4] via a gate terminal.

Power signal transmitted over the signal bus IN_OUT is a DC power signal while power signal transmitted to and from the coil assembly 510 is an AC power signal. The bridge circuit 500 may operate in either in an H-bridge mode to perform DC to AC conversion or in a Sync-bridge mode to perform AC to DC conversion. For at least one embodiment, the bridge circuit 500 is operable in both the power receive and power transmit modes of an inductive signal interface, such as the inductive signal interface 230 of FIG. 2B. More specifically, the bridge circuit 500 operates in the H-bridge mode during the power transmit mode of the inductive signal interface and in the Sync-bridge mode during the power receive mode of the inductive signal interface. During either mode of operation of the bridge circuit 500, the control signals CTR_BRG selectively turn on one pair of switches within switches 501-504 while another pair of switches is turned off to perform AC to DC or DC to AC conversions. According to some embodiments, switches 501 and 504 form a switch pair and switches 502 and 503 form another switch pair. Thus, while switches 501 and 504 are turned on, switches 502 and 504 are turned off and vice versa.

In either mode of operation, the bridge circuit 500 is capable of changing a current path of a power signal to perform AC to DC or DC to AC conversion. More specifically, in the H-bridge mode, the bridge circuit 500 receives a DC current via the signal bus IN_OUT and selectively operates the pairs of switches to alternate the direction of current flow to the coil assembly 510 over the PWR bus. For example, when switches 501 and 504 are on or closed, current flows from IN_OUT through switch 501 and node N1 to reach the coil assembly 510. On the other hand, when switches 503 and 502 are on or closed, current flows from IN_OUT through 503 and node N2 to reach the coil assembly 510. By alternating the direction of current flow to the coil assembly 510, the bridge circuit 500 performs DC to AC conversion and transmits an AC power signal to the coil assembly 510. Similarly, in the Sync-bridge mode, the bridge circuit 500 selectively operates the switches 501-504 to perform AC to DC conversion. In some embodiments, IN_OUT is coupled to a low pass filter as part of the AC to DC conversion process.

Voltage variation between nodes N1 and N2, detected through sense signals SENS_PWR[1] and SENS_PWR[2], may be used to determine how to operate the switches 501-504. For example, in the Sync-bridge mode, when it is detected that voltage of node N1 is higher than voltage of node N2, switches 501 and 504 may be turned on to ensure correct direction of current flow to IN_OUT. Voltage variation between N1 and N2 may also indicate that the coil assembly 510 is being inductively or resonantly coupled to a coil on another device. Accordingly, this voltage variation may be used by control circuitry (such as control circuitry 232 of FIG. 2B) to determine a mode of operation for an inductive signal interface (such as inductive signal interface 230 of FIG. 2B) in which the bridge circuit 500 is implemented. In one embodiment, the switch pairs may be periodically turned on and off based on a frequency of the AC signal transmitted over the signal bus PWR.

The bridge circuit 500 can also enter an off mode which may correspond with the aforementioned idle or communication-only modes of the inductive signal interface. During the off mode, all switches 501, 502, 503, and 504 receive a control voltage corresponding to an off state for the switches. According some embodiments, before entering the off mode, the bridge circuit 500 is configured to turn off the switches 501-504 individually to prevent back current from the coil assembly.

Figure 6A:
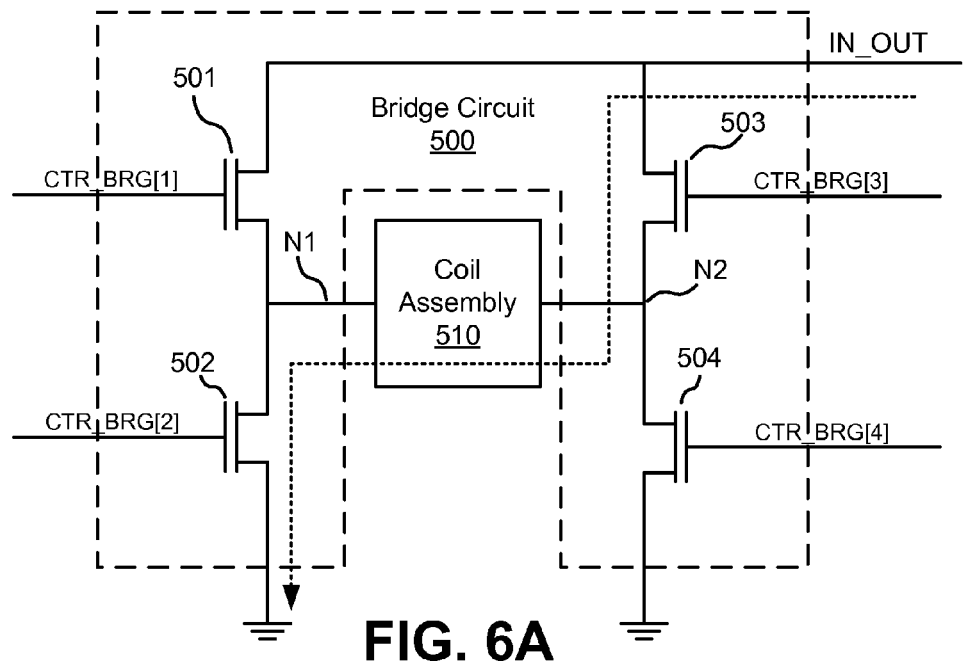
FIG. 6A-6D illustrate current paths within the embodiment of the bridge circuit of FIG. 5.

FIG. 6A illustrates a current path through the bridge circuit 500 and coil assembly 510 of FIG. 5 while the bridge circuit is operating in the H-bridge mode. A DC power signal is received via signal line IN_OUT. Switches 502 and 503 are on while switches 501 and 504 are off. The power signal flows through switch 503 and node N2 to the coil assembly 510. Current exits coil assembly 510 at node N1 and flows through switch 502 to ground potential.

Figure 6B:
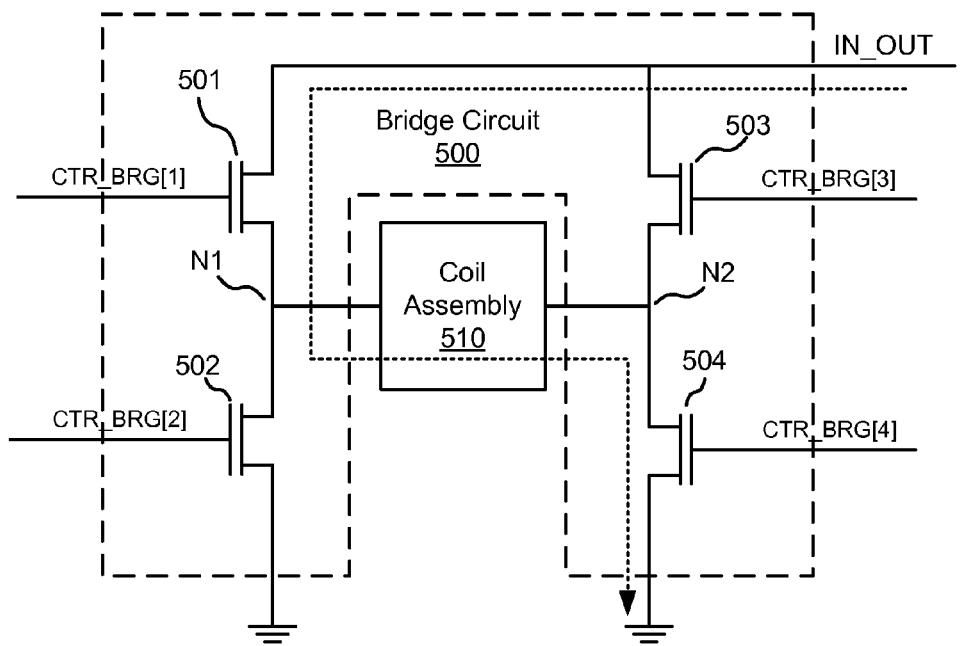

FIG. 6B illustrates another current path through the bridge circuit 500 and coil assembly 510 of FIG. 5 while the bridge circuit is operating in the H-bridge mode. A DC power signal is received via signal line IN_OUT. Switches 501 and 504 are on while switches 502 and 503 are off. The power signal flows through switch 501 and node N1 to the coil assembly 510. Current exits coil assembly 510 at node N2 and flows through switch 504 to ground potential.

Figure 6C:
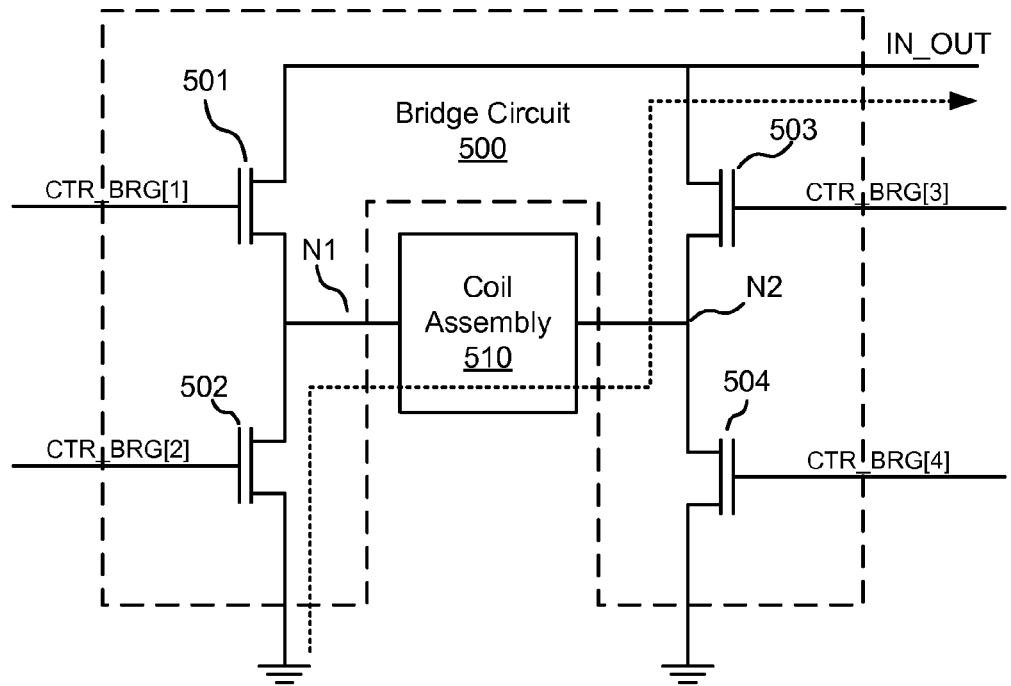

FIG. 6C illustrates a current path through the bridge circuit 500 and coil assembly 510 of FIG. 5 while the bridge circuit is operating in the Sync-bridge mode. An AC power signal is received from coil assembly 510. The depicted current path is active when the AC power signal received from coil assembly 510 has a higher voltage at node N2 than at node N1. Switches 502 and 503 are on while switches 501 and 504 are off. Current flows from ground potential through switch 502 and node N1 to the coil assembly 510. Current exits coil assembly 510 at node N2 and flows through switch 503 to reach signal bus IN_OUT.

Figure 6D:
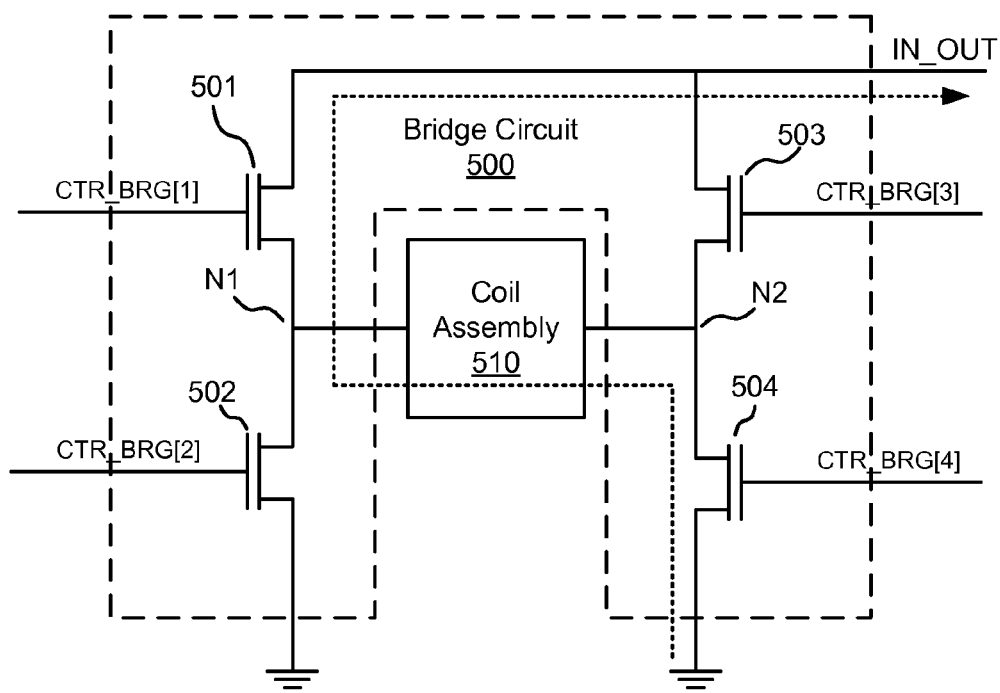

FIG. 6D illustrates another current path through the bridge circuit 500 and coil assembly 510 of FIG. 5 while the bridge circuit is operating in the Sync-bridge mode. An AC power signal is received from coil assembly 510. The depicted current path is active when the AC power signal received from coil assembly 510 has a higher voltage at node N1 than at node N2. Switches 501 and 504 are on while switches 502 and 503 are off. Current flows from ground potential through switch 504 and node N2 to the coil assembly 510. Current exits coil assembly 510 at node N1 and flows through switch 501 to reach signal bus IN_OUT.

Figure 7:
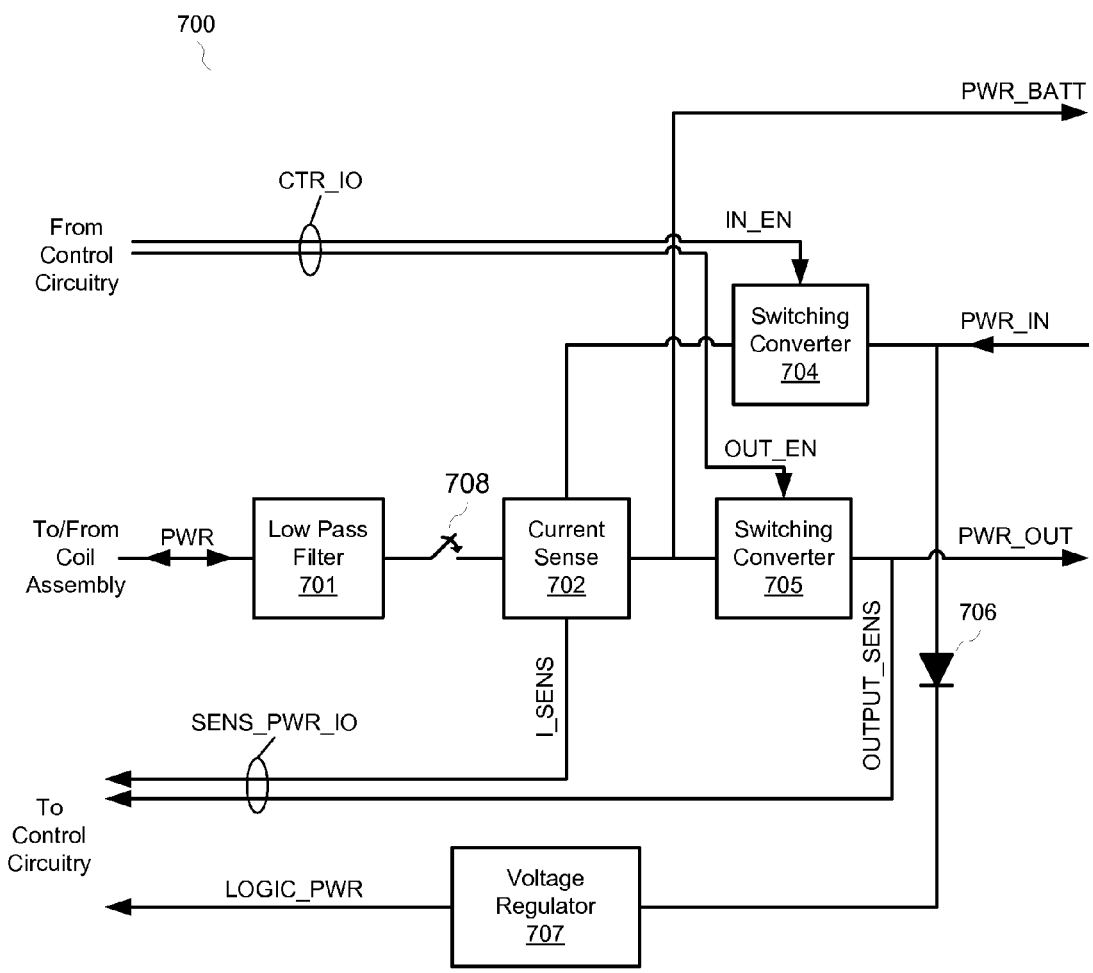
FIG. 7 is a block diagram of one embodiment of the power I/O circuitry of FIG. 3.

FIG. 7 is a block diagram of power I/O circuitry, according to an embodiment. Power I/O circuitry 700 may be an embodiment of the power I/O circuitry 301 of FIG. 3. As described with respect to FIG. 3, the power I/O circuitry 700 is configured to direct a power signal from a power signal line to a bridge circuit or vice-versa. The power I/O circuitry 700 has inputs coupled to a signal bus CTR_IO, outputs to transmit signals LOGIC_PWR and a signal bus SENS_PWR_IO, and an I/O port coupled to a power signal line PWR. The power I/O circuitry 700 also has an input to receive an input power signal PWR_IN and an output to transmit output power signals PWR_OUT and PWR_BATT. The power I/O circuitry 700 includes a low pass filter 701, a current sense element 702, switching converters 704 and 705, a diode 706, a voltage regulator 707, and a over-voltage-protection (OVP) switch 708.

The low pass filter 701 is coupled between the signal line PWR and the OVP switch 708. The current sense element 702 is coupled to the OVP switch and also has an input coupled to the switching converter 704 and an output coupled to the switching converter 705. The current sense element 702 also has an output coupled to signal line I_SENS which a signal line within the signal bus SENS_PWR_IO. The switching converter 704 is coupled between the current sense element 702 and the input power signal line PWR_IN. The switching converter 705 is coupled between the current sense element 702 and the output power signal line PWR_OUT. The diode 706 is coupled between the input power signal line PWR_IN and the voltage regulator 707 which has an output to generate the output signal LOGIC_PWR. Output power signal line PWR_OUT is coupled to an output signal line OUTPUT_SENS which a signal line within signal bus SENS_PWR_IO.

Switching converters 704 and 705 receive and are controlled by controls signals IN_EN and OUT_EN which are signals which are signals within the signal bus CTR_IO. According to one embodiment, the switching converters 704 and 705 each receives an input signal and operates to transmit an output signal which is at a different voltage level than the input signal. The switching converter 704 is coupled to receive an input power signal through power signal line PWR_IN and transmits an output power signal to the current sense element 702. The switching converter 705 receives an input signal from the current sense element 702 and transmits an output power signal via the power signal line PWR_OUT. According to an embodiment, the switching converters 704 and 705 can each operate in an off position to act as a shunt, allowing no signals to pass through. According to some embodiments, the switching converters 704 and 705 each includes one or more FETs.

The OVP switch 708 is configured to enter an off (i.e. non-conductive) state when it is detected that a voltage exceeds a predetermined threshold, in order to protect elements of the power subsystem 700 from damage from high voltages. Otherwise, the OVP switch 708 operates in an on (i.e. conductive) state. For one embodiment, the OVP switch 708 is configured to enter the off state when the voltage on the power signal line PWR exceeds the predetermined threshold.

The power subsystem 700 is configured to direct received power signals to desired outputs and to output sense signals that indicate a current flow (or voltage) of the received power signals and output power signals. Referring back to FIGS. 2A and 2B, the power subsystem 700 can be coupled to control circuitry such as the control circuitry 232 of FIG. 2B and to a coil assembly such as the coil assembly 233 of FIG. 2B.

In one mode of operation of the power subsystem 700, an input power signal is received via the input power signal line PWR_IN. The switch 704 is configured to enter or remain in the closed state by the control signal 704. The input power signal propagates through the switch 704 to the current sense element 702. The current sense element 702 outputs power signals to the low pass filter and the switch 705. The switch 705 is configured to enter or remain in the open state by the control signal OUT_EN and thus does not conduct any current. The low pass filter 701 receives power signals transmitted by the current sense element 702 and operates to eliminate frequency components above a certain threshold to output an output power signal to the power signal line PWR. Current sense element 702 also transmits a power signal to the output power signal line PWR_BATT which, according to some embodiments, is coupled to a battery or to battery charging circuitry. The diode 706 also receives input power signal via the input power signal line PWR_IN. The diode 706 allows current to propagate to the voltage regulator 707 which operates to maintain a constant voltage level at its output LOGIC_PWR. Signal line LOGIC_PWR can be coupled to transmit a power signal to circuit components to provide those components with a source of power.

In another mode of operation of the power subsystem 700, an input power signal is received via the power signal line PWR. The low pass filter 701 receives the input power signal and operates to eliminate frequency components above a certain threshold to transmit a filtered power signal to the current sense element 702. The current sense element 702 transmits a first output power signal via the output power signal line PWR_BATT and a second output power signal to the switch 705. The switch 705 is configured to enter or remain in the closed state by the control signal OUT_EN and the second output power signal is propagated to the output power signal line PWR_OUT. The switch 704 is configured to enter or remain in the open state and does not conduct any current.

In each of the aforementioned modes of operation of the power subsystem 700, the current sense element 702 generates the output sense signal I_SENS which indicates a current level of the signals received or transmitted by the current sense element 702.

Figure 8A:
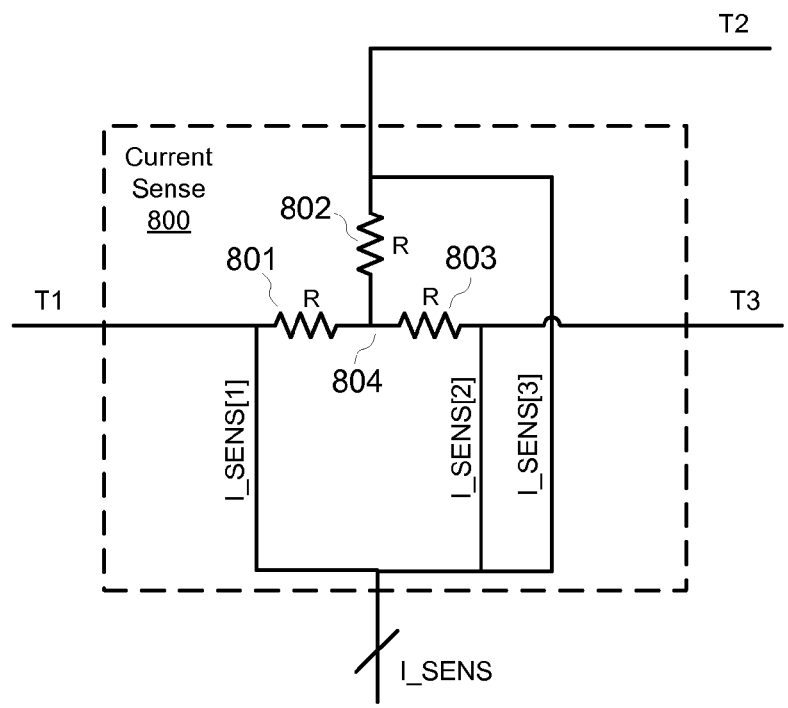
FIG. 8A illustrates an embodiment of the current sense element of FIG. 7.

FIG. 8A is a circuit diagram illustrating a current sense element, according to an embodiment. A current sense element maybe used to determine one or more current flows such as described with an embodiment of FIG. 7 and may be an embodiment of the current sense element 702 of FIG. 7. Current sense element 800 has three terminals T1, T2, and T3 and includes three resistors 801, 802, and 803 each having a pre-determined resistance value R. The resistors 801, 802, and 803 are coupled between a common node 804 and a respective one of the terminals T1, T2, and T3. Resistor 801 is coupled between node 804 and terminal T1. Resistor 802 is coupled between node 804 and terminal T2. Resistor 803 is coupled between node 804 and terminal T3. The current sense element 800 also has an output coupled to a signal bus I_SENS. Signal bus I_SENS includes three signals lines I_SENS[1 . . . 3], each being coupled to one of the terminals T1, T2, and T3. I_SENS[1] is coupled to terminal T1. I_SENS[2] is coupled to terminal T2. I_SENS[3] is coupled to terminal T3.

The current sense element 800 is configured to direct current from any of the terminals T1, T2, or T3 to any other terminal. It also provides current flow information through the signals I_SENS[1 . . . 3]. More specifically, the current sense element 800 is able to detect current flow from between each of the three pairs of terminals (i.e. between T1 and T2, between T2 and T3, and between T1 and T3) by measuring the voltage at the terminals T1, T2, and T3.

Figure 8B:
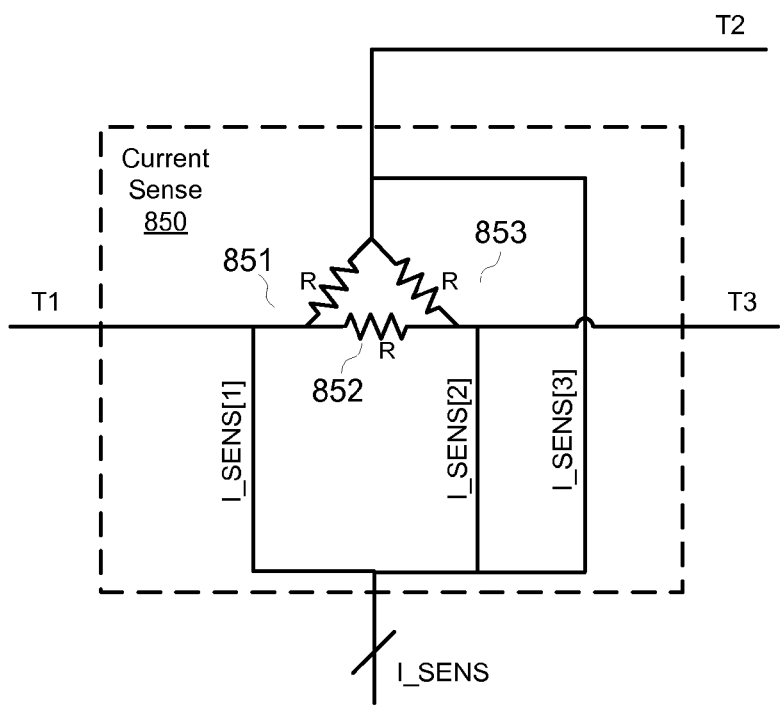
FIG. 8B illustrates another embodiment of the current sense element of FIG. 7.

FIG. 8B is a circuit diagram illustrating another embodiment of a current sense element. Current sense element 850 may be an embodiment of the current sense element 702 of FIG. 7. Current sense element 850 has three terminals T1, T2, and T3 and includes three resistors 851, 852, and 853 each having a pre-determined resistance value R. The resistor 851 is coupled between terminals T1 and T2, the resistor 852 is coupled between terminals T1 and T3, and resistor 853 is coupled between terminals T2 and T3. The current sense element 850 also has an output coupled to a signal bus I_SENS. Signal bus I_SENS includes three signals lines I_SENS[1 . . . 3], each being coupled to one of the terminals T1, T2, and T3. I_SENS[1] is coupled to terminal T1. I_SENS[2] is coupled to terminal T2. I_SENS[3] is coupled to terminal T3.

The current sense element 850 is configured to direct current from any of the terminals T1, T2, or T3 to any other terminal. It also provides current flow information through the signals I_SENS[1 . . . 3]. More specifically, the current sense element 850 is able to detect current flow from between each of the three pairs of terminals (i.e. between T1 and T2, between T2 and T3, and between T1 and T3) by measuring the voltage at the terminals T1, T2, and T3.

Figure 9:
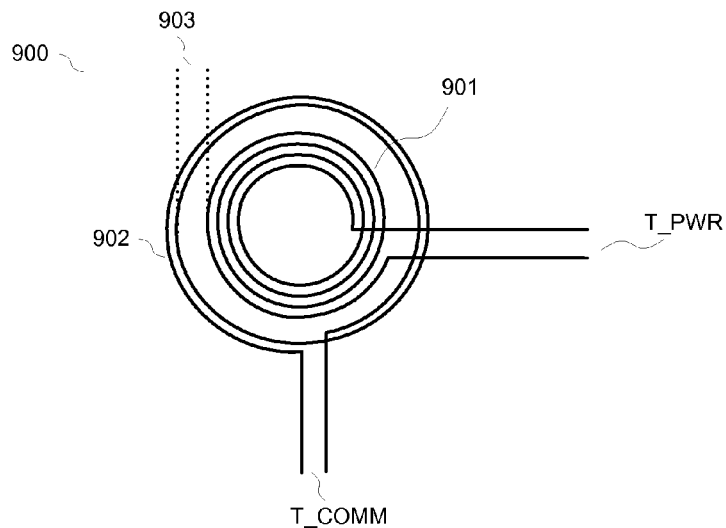
FIG. 9 illustrates an embodiment of the coil assembly of FIGS. 2A and 2B.

FIG. 9 illustrates an embodiment of a coil assembly that can be configured to form an inductive link in the manner described throughout this application. Coil assembly 900 may be an embodiment of the coil assembly 233 of FIG. 2B. The coil assembly 900 includes a power coil 901, and a communications coil 902. The power coil 901 and the communication coil 902 are separated by an air gap 903. The power coil has a terminal T_PWR. The communications coil has a terminal T_COMM. In some implementations, the coil assembly 900 may be coupled to a power subsystem such as the power subsystem 231 of FIG. 2B and to a communications subsystem such as the communications subsystem 234 of FIG. 2B. In such an implementation, terminal T_PWR is coupled to the power subsystem and terminal T_COMM is coupled to the communications subsystem.

Figure 10:
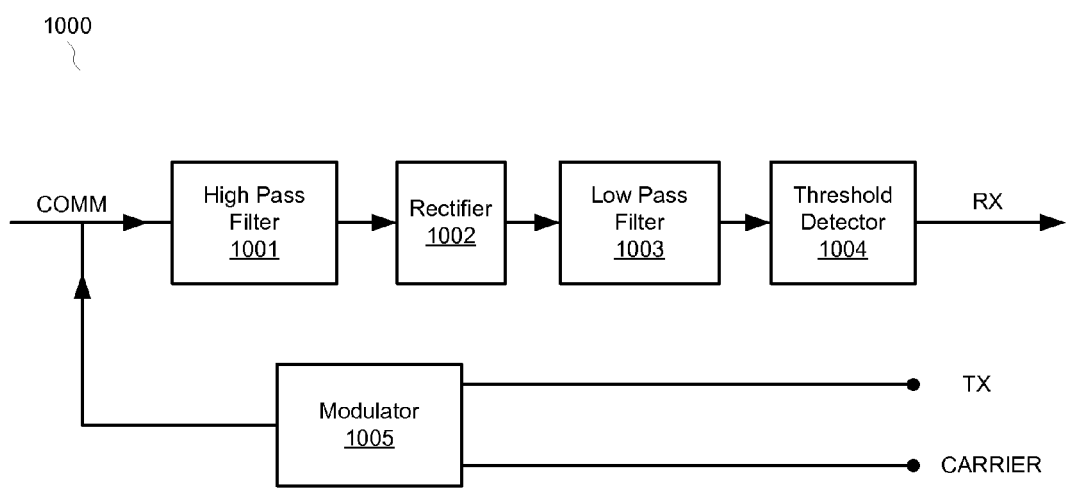
FIG. 10 illustrates an embodiment of the communication subsystem of FIG. 2B.

FIG. 10 illustrates an embodiment of a communication subsystem which may be an embodiment of the communication subsystem 234 of FIG. 2B. As described with respect to FIG. 2B, communication subsystem 1000 is configured to perform signal processing functions on data signals. The signal processing functions may include modulating a carrier frequency with the data signal, and de-modulating the data signals. The communication subsystem 1000 has inputs to receive input data TX, a carrier signal CARRIER, an output to transmit output data RX, and a port coupled to bi-directional signal line COMM. The communication subsystem 1000 includes a high-pass filter 1001, a rectifier 1002, a low pass filter 1003, a threshold detector 1004 and a modulator 1005.

The high pass filter 1001 has an input coupled to the bi-directional signal line COMM and an output coupled to an input of the rectifier 1002. The rectifier 1002 has an output coupled to an input of the low-pass filter 1003 which also has an output coupled to the input of the threshold detector 1004. The threshold detector 1004 has an output to transmit the output data signal RX. The modulator 1005 has two inputs to receive the input data TX, and the carrier signal CARRIER. An output of the modulator 1005 is coupled to the bi-directional signal line COMM.

The high pass filter 1001 is coupled to the bi-directional signal line COMM to receive a communication signal and operates to eliminate low frequency components of the communication signal to generate a filtered communication signal. The rectifier 1002 receives the filtered communication signal from the high pass filter 1001, and performs AC to DC conversion on the filtered communication signal to generate a DC signal as an output. The rectifier 1002 outputs the DC signal to the low pass filter 1003. The low pass filter 1003 operates to eliminate frequency components higher than a certain frequency threshold from the DC signal to generate an analog signal that is transmitted to the threshold detector 1004. The threshold detector 1004 digitizes the analog signal to generate the output data signal RX. According to some embodiments, the threshold detector 1004 digitizes the analog signal by detecting instances when the analog signal crosses a voltage threshold to generate a digital value of 1 for those instances and a digital value of 0 for time when the analog signal does not cross the voltage threshold.

Figure 11:
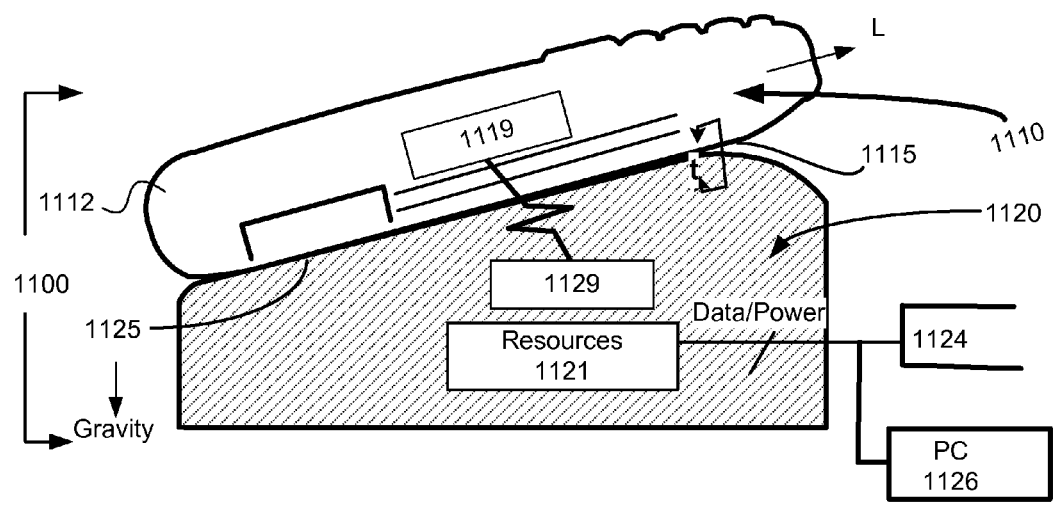
FIG. 11 is a representative diagram illustrating two computing devices that can be brought into proximity for purpose of enabling one device to provide a power and/or data signal to the other device, according to one or more embodiments.

FIG. 11 is a representative diagram illustrating two computing devices that can be brought into proximity for purpose of enabling one device to provide a power and/or data signal to the other device, according to an embodiment. Numerous embodiments described herein may be implemented using a mobile computing device and dock as two devices that are brought into proximity with one another for purpose of power/data transfer without use of traditional insertive or mechanically coupled connectors. However, different kinds of devices (e.g. portable devices and accessory devices) may be used with embodiments described herein. In many of the examples provided herein, two devices that are inductively coupled correspond to a mobile computing device (also referred to as an "MCD") and a dock or docking station.

However, embodiments may also be implemented using other types of devices. In one implementation, the MCD is a mufti-purpose device having cellular data and telephonic capabilities, while the accessory device corresponds to, for example, a docking station (for communications and power supply), sticky (or piggy)-back accessory, a light projector, a speaker set, or headset station. As an addition or alternative to cellular telephony/data capabilities, the MCD may include, for example, functionality for use as a media player, a camera or video recorder, a global positioning unit, an ultra-mobile personal computer, a laptop computer, or a multi-purpose computing device. Numerous other examples and implementations are described herein, including embodiments in which three or more devices are interconnected through one or more connector-less connections.

Likewise, the dock 1120 can be provided as an inductive landing pad or station of another device. For example, the dock 1120 may be provided as an integrated component of a printer, personal computer, portable computer (e.g. laptop), computer accessory, or vehicle dashboard.

Accordingly, a system 1100 includes a MCD 1110 that is supported or otherwise retained by a dock 1120. The manner in which the MCD 1110 is supported may vary. Moreover, as described with one or more embodiments, the orientation of the MCD on the dock may be changed by the user for purpose of configuring operations or behavior of one or both devices. According to an orientation of an embodiment shown, the MCD 1110 is supported on the dock 1120 in a partially upright position along its length axis (L). Such an orientation may correspond to a 'portrait' position. In an embodiment in which alternative orientations are possible, one or more 'landscape' positions, or positions in between the portrait and landscape positions may be possible.

According to an embodiment, the dock 1120 utilizes physical support structures (not shown), such as shelves, platforms, hooks or mechanical retention features, to retain the MCD 1110 in a docked or mated position. In another embodiment, magnetic clasps may be included or provided the dock 1120 and/or the MCD 1110 to secure retention of the MCD against the dock. Priority U.S. patent application Ser. No. 12/239,656, which is incorporated by reference herein in its entirety, details the use of magnetic clasps and ferrous (or other) material in order to physically retain the MCD 1110 in a docked position with the dock 1120.

The dock 1120 may include resources 1121 for generating or extending power and/or data signals to the MCD 1110. For example, the dock 1120 may be mated with a power outlet 1124 or another computer 1126 (e.g. desktop computer) to extend power and/or data signals. The resources 1121 may include circuitry or hardware, such as AC/DC converters and regulators. In order to enable the dock 1120 to receive electrical power from a personal computer or other computing station, one implementation provides for the dock 1120 to include a physical connector port, such as provided by a Universal Serial Bus (USB) connector. Additionally, the dock 1120 may include data acquisition capabilities, provided through connector ports with the computer 1126, wireless ports (e.g. cellular, WiMax connection, Bluetooth), Internet ports, and media feeds (e.g. provided through television tuner and cable).

As shown by an embodiment of FIG. 11, the MCD 1110 has a housing shell 1112 having a thickness (t). The housing shell 1112 may be used to retain internal components of the MCD 1110, such as a circuit board, processor, memory, or components of a display assembly. The MCD 1110 may be structured so that a primary facade 1115 (e.g. the back panel) of the housing shell 1112 rests on a receiving surface 1125 of the dock 1120.

As described throughout this application, the two computing devices are each provided an inductive signal interface 1119, 1129 for enabling one device to inductively transmit power to the other device. In accordance with embodiments described herein, the inductive signal interface 1119, 1129 of each device may be implemented using a bridge circuit such as described with FIGS. 6A to 6D and elsewhere in this application. In this manner, embodiments described herein provide a system and technique for delivering electrical power from over short distances without the use of electrical conductors While an embodiment described with FIG. 11 depicts two computing devices that use the inductive signal interface to inductively couple and signal power, other embodiments provide for use of other computing devices and device pairings. For example, the two inductively paired devices may correspond to a mobile computing device and headset, two mobile computing devices, or mobile computing device and power-resourced holster.

Embodiments described herein include individual elements and concepts described herein, independently of other concepts, ideas or systems, as well as combinations of elements recited anywhere in this application. Although illustrative embodiments of the invention have been described in detail with reference to the accompanying drawings, it is to be understood that the described embodiments are not limited to those precise embodiments, but rather include modifications and variations as provided. Furthermore, a particular feature described either individually or as part of an embodiment can be combined with other individually described features, or parts of other embodiments, even if the other features and embodiments make no mention of the particular feature.

What is claimed is:

1. A wireless signal interface comprising:
a coil assembly including one or more coils;
a bridge circuit coupled to the coil assembly to operate in a first mode or a second mode, the bridge circuit to enable power to be transmitted using the one or more coils in the first mode and power to be received using the one or more coils in the second mode; and
control circuitry to generate one or more control signals to selectively configure the bridge circuit to operate in the first mode to enable the wireless signal interface to transmit power or in the second mode to enable the wireless signal interface to receive power.

2. The wireless signal interface of claim 1, wherein the coil assembly is configurable to be wirelessly coupled to a second device through one or more of: i) inductive coupling, or ii) magnetic resonance coupling or evanescent coupling.

3. The wireless signal interface of claim 1, wherein the bridge circuit includes a plurality of electrically controlled switches, and wherein the one or more control signals operate the electrically controlled switches by selectively enabling and disabling each of the switches to configure the bridge circuit to operate in the first mode or the second mode.

4. The wireless signal interface of claim 3, wherein the electrically controlled switches are MOSFETs.

5. The wireless signal interface of claim 3, wherein during operation of the wireless signal interface, the wireless signal interface selectively switches between the first mode and the second mode.

6. The wireless signal interface of claim 5, wherein the wireless signal interface selectively switches between the first mode and the second mode based on: i) a power transmission enable signal, or ii) a power receive enable signal.

7. The wireless signal interface of claim 6, wherein the wireless signal interface detects a voltage variation within the bridge circuit and generates the power receive enable signal based, at least in part, on the detected voltage variation.

8. The wireless signal interface of claim 3, wherein the wireless signal interface includes an input to receive an input direct current signal and an output to transmit an output direct current signal.

9. The wireless signal interface of claim 8, wherein the control circuitry selectively operates the electrically controlled switches in the second mode to enable the bridge circuit to receive a power signal from the coil assembly and to transmit the power signal as the output direct current signal.

10. The wireless signal interface of claim 8, wherein the control circuitry selectively operates the electrically controlled switches in the first mode to enable the bridge circuit to receive a power signal as the input direct current signal and to transmit the received input direct current signal as an alternating current signal to the coil assembly.

11. The wireless signal interface of claim 8, wherein the wireless signal interface includes a current sensing element coupled to the bridge circuit, the input, and the output, wherein the current sensing element measures a first current between the input and the bridge circuit, a second current between the bridge and the output, and a third current between the input and the output.

12. The wireless signal interface of claim 1, wherein the coil assembly includes a power coil for wirelessly transmitting or receiving a power signal and a communications coil for wirelessly transmitting or receiving a data signal.

13. The wireless signal interface of claim 1, wherein the coil assembly includes a coil for wirelessly transmitting or receiving a power signal and for wirelessly transmitting or receiving a data signal.

14. The wireless signal interface of claim 13, wherein the data signal is modulated by a carrier signal.

15. A mobile computing device comprising:
a power source; and
an inductive signal interface including an input to receive an input direct current signal and an output to transmit an output direct current signal, the inductive signal interface comprising:
a coil assembly including one or more coils;
a bridge circuit coupled to the coil assembly to operate in a first mode or a second mode;
control circuitry to generate one or more control signals to selectively configure the bridge circuit to operate in the first mode to enable the inductive signal interface to transmit power or in the second mode to enable the inductive signal interface to receive power; and
wherein the control circuitry includes a current sensing element coupled to the bridge circuit, the input, and the output, the current sensing element to measure a first current between the input and the bridge circuit, a second current between the bridge and the output, and a third current between the input and the output.

16. The mobile computing device of claim 15, wherein the bridge circuit of the inductive signal interface includes a plurality of electrically controlled switches, and wherein the one or more control signals operate the electrically controlled switches by selectively enabling and disabling each of the switches to configure the bridge circuit to operate in the first mode or the second mode, and wherein the electrically controlled switches are MOSFETs.

17. The mobile computing device of claim 15, wherein during operation of the inductive signal interface, the inductive signal interface selectively switches between the first mode and the second mode.

18. The mobile computing device of claim 17, wherein the inductive signal interface selectively switches between the first mode and the second mode based on a power transmission enable signal or a power receive enable signal.

19. A system comprising:
a first device; and
a mobile computing device to inductively couple to the first device, the mobile computing device comprising:
a power source; and
an inductive signal interface including an input to receive an input direct current signal and an output to transmit an output direct current signal, the inductive signal interface comprising:
a coil assembly including one or more coils;
a bridge circuit coupled to the coil assembly to operate in a first mode or a second mode;
control circuitry to generate one or more control signals to selectively configure the bridge circuit to operate in the first mode to enable the inductive signal interface to transmit power to the first device or in the second mode to enable the inductive signal interface to receive power from the first device; and wherein the control circuitry includes a current sensing element coupled to the bridge circuit, the input, and the output, the current sensing element to measure a first current between the input and the bridge circuit, a second current between the bridge and the output, and a third current between the input and the output.

* * * * *